United States Patent
Koh

(10) Patent No.: US 9,794,396 B2
(45) Date of Patent: Oct. 17, 2017

(54) PORTABLE TERMINAL AND METHOD FOR CONTROLLING MULTILATERAL CONVERSATION

(71) Applicant: Samsung Electronics Co., Ltd., Gyeonggi-do (KR)

(72) Inventor: Myung-Geun Koh, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 33 days.

(21) Appl. No.: 14/286,870

(22) Filed: May 23, 2014

(65) Prior Publication Data

US 2014/0349628 A1  Nov. 27, 2014

(30) Foreign Application Priority Data

May 23, 2013 (KR) .................. 10-2013-0058335

(51) Int. Cl.
| | | |
|---|---|---|
| *H04W 4/12* | (2009.01) | |
| *H04W 4/06* | (2009.01) | |
| *H04W 8/24* | (2009.01) | |
| *H04M 1/725* | (2006.01) | |

(52) U.S. Cl.
CPC .... *H04M 1/72583* (2013.01); *H04M 1/72552* (2013.01); *H04M 2250/22* (2013.01)

(58) Field of Classification Search
CPC ......... H04M 1/72583; H04M 1/72552; H04M 2250/22; H04M 1/72563
USPC ...................... 455/416, 518, 566, 412.1, 519
See application file for complete search history.

(56) References Cited

U.S. PATENT DOCUMENTS

| | | | | |
|---|---|---|---|---|
| 2002/0067381 A1* | 6/2002 | Hugh | ............... | G06F 17/30994 715/854 |
| 2003/0079036 A1* | 4/2003 | Terada | .................. | H04H 60/04 709/231 |
| 2004/0184445 A1* | 9/2004 | Burne | ................ | H04L 12/5835 370/352 |
| 2009/0286561 A1* | 11/2009 | Lee | ......................... | H04W 4/14 455/466 |
| 2010/0321312 A1* | 12/2010 | Han | ...................... | G06F 1/1694 345/173 |
| 2011/0249079 A1* | 10/2011 | Santamaria | ......... | H04M 7/0057 348/14.02 |

FOREIGN PATENT DOCUMENTS

| | | |
|---|---|---|
| KR | 10-2005-0023800 | 3/2005 |
| KR | 10-2007-0023469 A | 2/2007 |

* cited by examiner

*Primary Examiner* — Inder Mehra

(57) ABSTRACT

The present disclosure relates generally to a portable terminal, and more particularly, to a portable terminal and method for controlling multilateral conversation in a portable terminal. The method includes detecting an event for a one-to-one conversation with a particular person during a multilateral conversation. The method also includes activating a one-to-one conversation function in response to the detection of the event. The method further includes sending data entered to an input window to the particular person using the activated one-to-one conversation function.

23 Claims, 20 Drawing Sheets

PORTABLE TERMINAL AND METHOD FOR CONTROLLING MULTILATERAL CONVERSATION

CROSS-REFERENCE TO RELATED APPLICATION(S) AND CLAIM OF PRIORITY

The present application is related to and claims the benefit under 35 U.S.C. §119(a) of a Korean patent application filed on May 23, 2013 in the Korean Intellectual Property Office and assigned Serial No. 10-2013-0058335 the entire disclosure of which is incorporated hereby incorporated by reference.

TECHNICAL FIELD

The present disclosure relates generally to a portable terminal, and more particularly, to a portable terminal and method for controlling multilateral conversation.

BACKGROUND

Recent portable terminals can provide more diverse services and optional functions. To improve usefulness of the portable terminal and meet different desires of users, various practical applications have been developed. Accordingly, recent portable terminals, such as smart phones, cell phones, note Personal Computers (PCs) and tablet PCs, which may be carried by the user and have touch screens, can each store at least a couple to hundreds of applications.

Such portable terminals have become advanced to multimedia devices that can provide not only call services but also various multimedia services by way of data communication to meet user demands.

With the development of communication technologies, the portable terminal can also provide messenger services for sending and/or receiving messages between two users or among multiple users. Expansion of data services of telecommunication companies and increase in usage of smart phones lead to growth of usage of messenger services in the portable terminal. Accordingly, users of the portable terminal demand various functions to enable such messenger services to be more intuitively and efficiently used.

In a typical messenger service, when a user involved in a multilateral conversation wants to have one-to-one conversation with one of the participants of the multilateral conversation, the user needs to exit from the multilateral conversation window and newly establish a chat window with the person of interest or use a pre-established chat window. This can cause inconvenience by forcing the user to keep coming and going between the multilateral conversation window and the one-to-one conversation window. For example, in the typical messenger service, to start one-to-one conversation with a particular person during multilateral conversation, the user bothers to close the multilateral conversation window and then activate the one-to-one conversation window. In addition, while the user is answering to a question a participant asked during the multilateral conversation, other participants can keep chatting and thus the screen can be scrolled over, hiding the question out of the current multilateral conversation window. During the multilateral conversation provided by a typical messenger service, the more the answer to the question is delayed, the harder the continuity of conversation can be maintained, thus impeding the flow of the conversation.

Accordingly, a need exists for improving user convenience by providing a one-to-one conversation with a particular person during a multilateral conversation. Another need exists for providing a function to facilitate understanding of content answered to a question of a particular person and call attention to the content.

SUMMARY

To address the above-discussed deficiencies, it is a primary object to provide a portable terminal and method for controlling multilateral conversation.

In a first example, a method for controlling multilateral conversation in a portable terminal is provided. The method includes detecting an event for one-to-one conversation with a particular person during a multilateral conversation. The method also includes activating a one-to-one conversation function in response to the detection of the event. The method further includes sending data entered to an input window to the particular person using the activated one-to-one conversation function.

The event can include at least one of dragging a data send button (or send button) to the particular person, touching an icon of the particular person, and dragging the icon of the particular person to the input window.

The method can further include displaying a pop-up window in response to touching an icon of the particular person or dragging the icon of the particular person into the input window.

The method can further include displaying the data sent by adding an icon indicating one-to-one conversation in response to sending the entered data.

In a second example, a method for controlling multilateral conversation in a portable terminal is provided. The method includes activating a one-to-one conversation function with a particular person in response to an event of selecting data sent from the particular person during a multilateral conversation. The method also includes incorporating the data sent and data entered in an input window. The method further includes sending the incorporated data to the particular person.

The event can include at least one of dragging the data sent into the input window, dragging a button for sending the entered data to the data sent, and dragging the data sent to the button.

The method can further include displaying the data sent in a screen for displaying the multilateral conversation.

The method can further include ending the one-to-one conversation function in response to at least one of deleting an icon of the particular person displayed in the input window and dragging the icon out of the input window.

In a third example, a portable terminal for controlling multilateral conversation is provided. The portable terminal includes a touch screen configured to display multilateral conversation. The portable terminal also includes a controller configured to detect an event for one-to-one conversation with a particular person, activate a one-to-one conversation function in response to detection of the event, and send data entered to an input window to the particular person using the activated one-to-one conversation function.

The controller can detect at least one of dragging a data send button (or send button) to the particular person, touching an icon of the particular person, and dragging the icon of the particular person to the input window.

The controller can activate a conversation function with multiple participants of the multilateral conversation in response to detection of an event for conversation with the multiple participants during the multilateral conversation.

The controller can detect an event of selecting data sent from the particular person, activate the one-to-one conversation function with the particular person, and incorporate the data sent and data entered to the input window.

Other aspects, advantages, and salient features of the disclosure will become apparent to those skilled in the art from the following detailed description, which, taken in conjunction with the annexed drawings, discloses exemplary embodiments of the disclosure Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
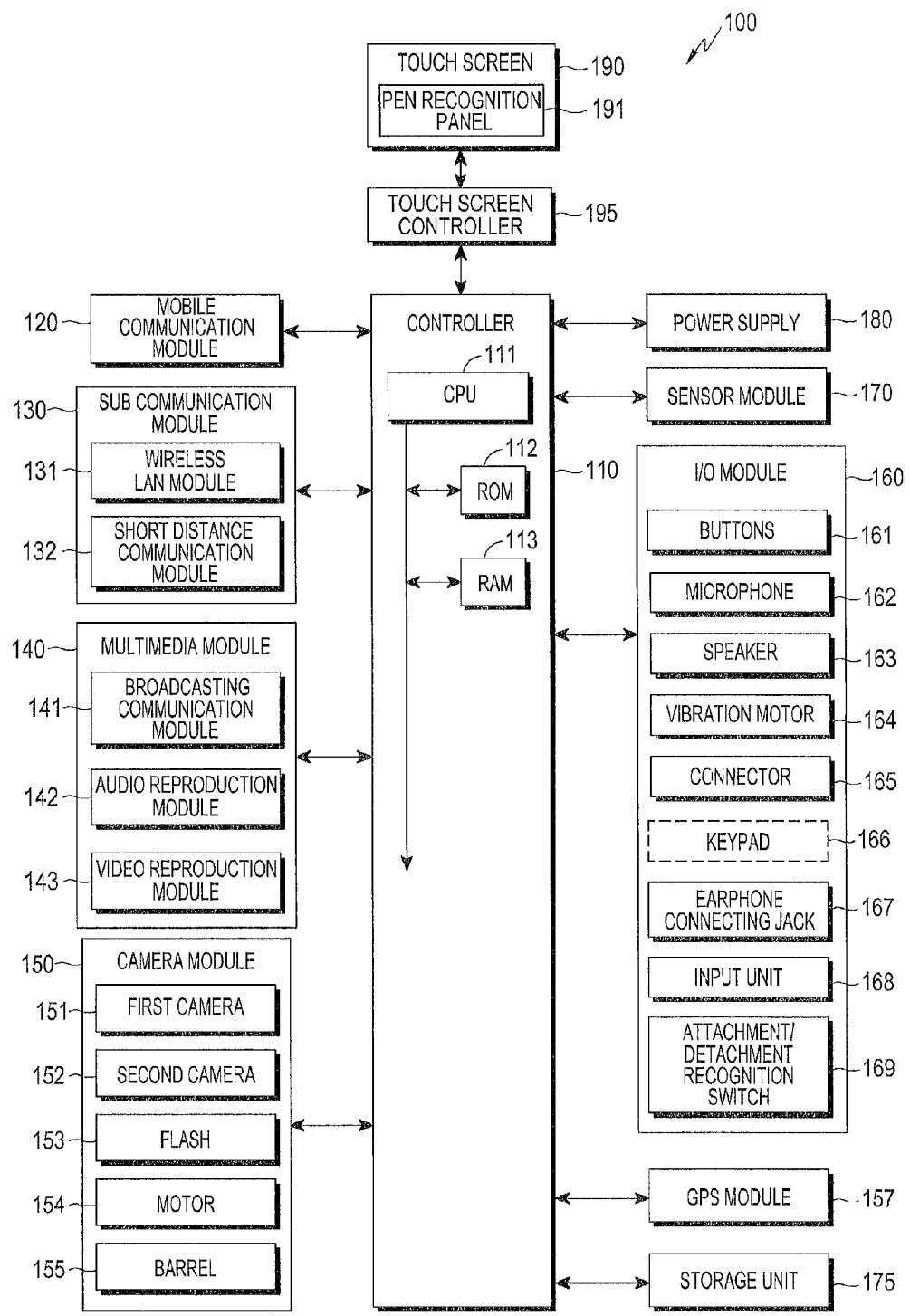
FIG. 1 is an example schematic block diagram of a portable terminal according to this disclosure.

FIGS. 1 through 9D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication terminal. The disclosure now will be described more fully hereinafter with reference to the accompanying drawings, in which illustrative embodiments of the disclosure are shown. This disclosure can, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

It will be understood that, although the terms first, second, third, etc., can be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~ and/or ~," or the like.

The terminology used herein is for the purpose of describing particular embodiments only and is not intended to be limiting of the disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Operating principles of embodiments of the present invention will now be described with reference to accompanying drawings. Descriptions of some well-known technologies that possibly obscure the invention will be omitted, if necessary. Further, terms, as will be mentioned later, are defined by taking functionalities of the present invention into account, but can vary depending on certain practices or intentions of users or operators. Accordingly, the definition of the terms should be made based on the descriptions throughout this specification.

First, terms as used herein can be defined as follows:

A portable terminal can be a mobile terminal carried by the user for voice and video calls and data communication, having at least one touch screen. The portable terminal can include smart phones, tablet Personal Computers (PCs), three dimensional (3D) televisions (TVs), smart TVs, Light Emitting Diode (LED) TV, Liquid Crystal Display (LCD) TV, etc., and any other terminals capable of communicating with surrounding devices or remote devices.

An input unit can be a unit including at least one of electronic pens and stylus pens that can provide commands or inputs to the portable terminal by touching or hovering over the touch screen of the portable terminal.

An object can be what is or may be displayed on the touch screen of the portable terminal including at least one of documents, widgets, photos, maps, videos, emails, Short Messaging Service (SMS) messages and Multimedia Messaging Service (MMS) messages, which can be executed, deleted, canceled, stored and/or changed. Such an object can also collectively refer to a shortcut icon, a thumbnail image, and a folder that has at least one object in the portable terminal.

Shortcut icon(s) can be icon(s) displayed on the touch screen of the portable terminal to quickly run corresponding application or default function of the portable terminal, such as making calls, displaying contacts and menus, and the like. A command or input for activating the shortcut icon can run a corresponding application.

FIG. 1 is an example schematic block diagram of a portable terminal according to this disclosure.

Referring to FIG. 1, a portable terminal 100 can be connected to an external device (not shown) by using at least one of a communication module 120, a sub-communication module 130, a connector 165, and a headset jack 167. The "external device" can include a variety of devices, such as earphones, external speakers, Universal Serial Bus (USB) memories, chargers, cradles/docks, Digital Multimedia Broadcasting (DMB) antennas, mobile payment related devices, health care devices (such as blood sugar testers), game consoles, vehicle navigations, or the like, which are removable from the portable terminal 100 and connected thereto via cable. The external device can include a Bluetooth communication device, a Near Field Communication (NFC) device, a Wireless Fidelity (Wi-Fi) Direct communication device, and a wireless Access Point (AP). The portable terminal 100 can also be connected to other devices, such as cell phones, smartphones, tablet PCs, desktop PCs, or servers wirelessly or via cable.

As shown in FIG. 1, the portable terminal 100 can further include at least one touch screen 190 and at least one touch screen controller 195. The portable terminal 100 can also include a controller 110, the mobile communication module 120, the sub-communication module 130, a multimedia module 140, a camera module 150, a Global Positioning System (GPS) module 157, an input/output module 160, a sensor module 170, a storage 175, and a power supply 180.

The sub-communication module 130 can include at least one of Wireless Local Area Network (WLAN) 131 and a short-range communication module 132, and the multimedia module 140 can include at least one of a broadcast communication module 141, an audio play module 142, and video play module 143. The camera module 150 can include at least one of a first camera 151 and a second camera 152. In an embodiment, the camera module 150 can include at least one of a lens barrel 155 for zooming in/out the first camera 151 and/or the second camera 152, a motor unit 154 for controlling the movement of the lens barrel 155 for zoom-in/out, and a flash 153 for providing light for shooting. The input/output module 160 can include at least one of a button 161, a microphone 162, a speaker 163, a vibrating motor 164, the connector 165, and a keypad 166.

The controller 110 can include a Central Processing Unit (CPU) 111, a Read Only Memory (ROM) 112 for storing a control program to control the portable terminal 100, and a Random Access Memory (RAM) 113 for storing signals or data input from outside or for being used as a memory space for working results in the portable terminal 100. The CPU 111 can include a single core, dual cores, triple cores, or quad cores. The CPU 111, ROM 112, and RAM 113 can be connected to each other via an internal bus.

The controller 110 can control the mobile communication module 120, the sub-communication module 130, the multimedia module 140, the camera module 150, the GPS module 157, the input/output module 160, the sensor module 170, the storage 175, the power supply 180, the touch screen 190, and the touch screen controller 195.

The controller 110 can determine whether a hovering event occurs, such as whether an input unit 168, for example as an electronic pen approaches any of a plurality of objects displayed on the touch screen 190 and can identify the object corresponding to a position where the hovering event occurs. Furthermore, the controller 110 can detect a distance between the screen of the portable terminal 100 and the input unit 168. The hovering event can include at least one of pressing a button equipped in the input unit 168, tapping with the input unit 168, fast moving with the input unit 168, and touching an object.

In addition, the controller 110 can detect an event for one-to-one conversation with a particular person during a multilateral conversation, activate the one-to-one conversation function in response to the detection of the event, and control an icon of the particular person to be displayed in an input window. The event can include at least one of dragging a data send button (or send button) to the particular person, touching an icon of the particular person, and dragging the icon of the particular person to the input window. The event can further include dragging the send button to the icon of the particular person after data to be sent to the particular person has bees input. Upon activation of the one-to-one conversation function, the controller 110 can control data entered into the input window to be sent to the particular person. The controller 110 can generate and display a pop-up window in response to the event of touching an icon of a particular person or an event of dragging the icon of the particular person to the input window. The pop-up window can include at least one of blocking the particular person, having one-to-one conversation with the particular person, showing the user offline to the particular person, and sending a message to the particular person. In response to sending the entered data, the controller 110 can control an icon that indicates the one-to-one conversation to be displayed in addition to the data. The controller 110 can then activate the one-to-one conversation function in response to dragging an icon displayed in the multilateral conversation screen into the input window. If the particular person sends a reply data in response to the data sent, the controller 110 can control the reply data sent from the particular person to be displayed using the activated one-to-one conversation function. The controller 110 can stop or inactivate the one-to-one conversation function in response to at least one of deleting the icon of the particular person dragged into the input window and dragging the icon out of the input window.

The controller 110 can activate the one-to-one conversation function with a particular person in response to an event of selecting data sent from the particular person during the multilateral conversation, and incorporate the data sent from the particular person and data entered into the input window. The controller 110 can display the incorporated data in the multilateral conversation screen. The incorporated data can include an icon shaped like a lock indicating one-to-one conversation, and can be displayed by the user's portable terminal and the particular person's portable terminal. The activation of the one-to-one conversation function can include displaying an icon of the particular person in the input window. The controller 110 can stop or inactivate the one-to-one conversation function in response to at least one of deleting the displayed icon of the particular person and dragging the icon out of the input window.

In addition, upon detection of an event to associate a group of some participants of the multilateral conversation to talk secretly during the multilateral conversation, the controller 110 can activate a group conversation function and control data communication among the participants of the group in the activated group conversation function.

The mobile communication module 120 can connect the portable terminal 100 to an external electronic device through mobile communication using at least one or more antennas under control of the controller 110. The mobile communication module 120 can transmit/receive wireless signals for voice calls, video conference calls, Short Message Service (SMS) messages, or Multimedia Message Service (MMS) messages to/from a cell phone, a smart phone, a tablet PC, the phones having phone numbers entered into the portable terminal 100.

The sub-communication module 130 can include at least one of the WLAN module 131 and the short-range communication module 132. For example, the sub-communication module 130 can include either the WLAN module 131 or the short range communication module 132, or both.

The WLAN module 131 can be connected to the Internet in a place where there can be a wireless AP, under control of the controller 110. The WLAN module 131 supports Institute of Electrical and Electronic Engineers' (IEEE's) WLAN standard IEEE802.11x. The short range communication module 132 can conduct short range communication between the portable terminal 100 and an image rendering device under control of the controller 110. The short-range communication can include Bluetooth, Infrared Data Association (IrDA), WiFi-Direct, NFC, etc.

The portable terminal 100 can include at least one of the mobile communication module 120, the WLAN module 131 and the short range communication module 132 depending on the performance. The portable terminal 100 can also include a combination of the mobile communication module 120, the WLAN module 131 and the short range communication module 132 depending on the performance. In an embodiment of the present invention, at least one or a combination of, not exclusively, the mobile communication module 120, the WLAN module 131, and the short-range communication module 132 can be referred to as a transceiver.

The multimedia module 140 can include the broadcast communication module 141, the audio play module 142, or the video play module 143. The broadcast communication module 141 can receive broadcast signals (such as television broadcast signals, radio broadcast signals, or data broadcast signals) and additional broadcast information (such as Electric Program Guide (EPG) or Electric Service Guide (ESG)) transmitted from a broadcasting station through a broadcast communication antenna under control of the controller 110. The audio play module 142 can play digital audio files (such as files having extensions, such as mp3, wma, ogg, or wav) stored or received under control of the controller 110. The video play module 143 can play digital video files (such as files having extensions, such as mpeg, mpg, mp4, avi, move, or mkv) stored or received under control of the controller 110. The video play module 143 can also play digital audio files.

The multimedia module 140 can include the audio play module 142 and the video play module 143 except for the broadcast communication module 141. The audio play module 142 or video play module 143 of the multimedia module 140 can be included in the controller 110.

The camera module 150 can include at least one of the first and second cameras 151 and 152 for capturing still images or video images under control of the controller 110. The camera module 150 can include at least one of the lens barrel 155 for zooming in/out to capture an object, the motor unit 154 configured to control the movement of the lens barrel 155, the flash 153 configured to provide auxiliary light required to capture an object. The first camera 151 can be placed on the front of the portable device 100 and the second camera 152 can be placed on the back of the portable device 100. In an embodiment, the first and second cameras 151 and 152 can be arranged adjacent to each other (such as the distance between the first and second cameras 151 and 152 can be within the range between 1 and 8 cm), capturing 3D still images or 3D video images.

The first and second cameras 151 and 152 can each include a lens system, an image sensor, etc. The first and second cameras 151 and 152 can be configured to convert optical signals input (or captured) through the lens system to electric image signals or data and sends the electric image signals or data to the controller 110, and the user can capture a video image or a still image with the first and second cameras 151 and 152.

A GPS module 157 can receive radio signals from a plurality of GPS satellites in Earth's orbit, and can calculate the position of the portable terminal 100 by using time of arrival from the GPS satellites to the portable terminal 100.

The input/output module 160 can include at least one of buttons 161, the microphone 162, the speaker 163, the vibrating motor 164, the connector 165, the keypad 166, the headset jack 167 and the input unit 168. However, the input/output module 160 may not be limited to the aforementioned elements, and can also include a mouse, a trackball, a joystick, or a cursor control such as cursor direction keys to control the movement of the cursor on the touch screen 190.

The at least one of buttons 161 can be arranged on the front, side, or back of the housing of the portable terminal 100, and can include at least one of power/lock button, volume button, menu button, home button, back button, and search button.

The microphone 162 can generate electric signals from received voice or sound under control of the controller 110.

The speaker 163 can output sounds corresponding to various signals (such as radio signals, broadcast signals, digital audio files, digital video files or photography signals) from the mobile communication module 120, sub-communication module 130, multimedia module 140, or camera module 150 to the outside of the portable terminal 100 under control of the controller 110. The speaker 163 can output sounds (such as button-press sounds or ringback tones) that correspond to functions performed by the portable terminal 100. There can be one or multiple speakers 163 arranged in a proper position or proper positions of the housing of the portable terminal 100.

The vibration motor 164 can convert an electric signal to a mechanical vibration under control of the controller 110. For example, while in vibrating mode of the portable terminal 100, the vibration motor 164 can work when an incoming call is received. There can be one or more vibration motors 164 inside the housing of the mobile terminal 100. The vibration motor 164 can be driven in response to a touch event or continuous touches of a user over the touch screen 190.

The connector 165 can be used as an interface for connecting the portable terminal 100 to the external device or a power source. Under control of the controller 110, the portable terminal 100 can transmit data stored in the storage 175 of the portable terminal 100 to the external device or receive data from the external device via a cable connected to the connector 165. Furthermore, the portable terminal 100 can be powered by the power source or can charge the battery with the power source via a cable connected to the connector 165.

The keypad 166 can receive key inputs from the user to control the portable terminal 100. The keypad 166 can include a mechanical keypad formed in the portable terminal 100 or a virtual keypad displayed on the touch screen 190. The mechanical keypad formed in the portable terminal 100 can be omitted depending on the performance or structure of the portable terminal 100.

An earphone can be inserted into the headset jack 167 to be connected to the portable terminal 100, and the input unit 168 can be kept inside the portable terminal 100 and drawn out or detached from the portable terminal 100 to be used.

An attachment/detachment recognition switch 169 operating in response to attachment and detachment of the input unit 168 can be equipped in an area inside of the portable terminal 100 where the input unit 168 can be inserted and can send a signal that corresponds to the attachment or the detachment of the input unit 168 to the controller 110. The attachment/detachment recognition switch 169 can be configured to have a direct or indirect contact with the input unit 168 when the input unit 168 is inserted into the area. The attachment/detachment recognition switch 169 can generate the signal that corresponds to the attachment or detachment of the input unit 168 based on the direct or indirect contact and can provide the signal to the controller 110.

The sensor module 170 can include at least one sensor for detecting a status of the portable terminal 100. For example, the sensor module 170 can include a proximity sensor configured to detect proximity of a user to the portable terminal 100, an illumination sensor configured to detect an amount of ambient light of the portable terminal 100, a motion sensor configured to detect the motion of the portable terminal 100 (such as rotation of the portable terminal 100, acceleration or vibration applied to the portable terminal 100), a geomagnetic sensor configured to detect a direction using the geomagnetic field, a gravity sensor configured to detect a direction of gravity action, and an altimeter configured to detect an altitude by measuring atmospheric pressure. At least one sensor can detect the status and generate a corresponding signal to transmit to the controller 110. A sensor of the sensor module 170 can be added or removed depending on the performance of the portable terminal 100.

The storage 175 can store signals or data input/output according to operations of the mobile communication module 120, the sub-communication module 130, the multimedia module 140, the camera module 150, the GPS module 157, the input/output module 160, the sensor module 170, and the touch screen 190 under control of the controller 110. The storage 175 can store control programs and applications for controlling the portable terminal 100 or the controller 110.

The term "storage" can imply not only the storage 175, but also the ROM 112, RAM 113 in the controller 110, or a memory card (such as a Secure Digital (SD) card, a memory stick) installed in the portable terminal 100. The storage 175 can also include a non-volatile memory, a volatile memory, a Hard Disc Drive (HDD), or a Solid State Drive (SSD).

The storage 175 can store many different functional applications, such as navigation systems, video telephony, games, one-to-one chatting applications, time-base alarming applications, and the like, images for graphical user interface (GUI) associated with the applications, databases related to user information, documents, methods for handling touch inputs, background images (such as menu screen, standby screen, etc.) required to operate the portable terminal 100, operating programs, images captured by the camera module 150, or the like. The storage 175 can be a machine-readable (or computer-readable) medium, which can be defined as a medium for providing data for a machine to perform a particular function. The machine-readable medium can be a storage medium. The storage 175 can include non-volatile and volatile media. These media should be all tangible for a mechanical device to read out instructions embodied on the media.

The machine-readable media can include at least one of floppy disks, flexible disks, hard disc, magnetic tapes, Compact Disc Read-Only Memories (CD-ROMs), optical discs, punch cards, paper tapes, RAMs, Programmable ROMs (PROM), Erasable PROMs (EPROMs), and flash-EPROMs.

The power supply 180 can supply power to one or more batteries placed inside the housing of the portable terminal 100, under control of the controller 110. The one or more batteries power the portable terminal 100. The power supply 180 can supply the portable terminal 100 with the power input from the external power source via a cable connected to the connector 165. The power supply 180 can also supply the portable terminal 100 with wireless power from an external power source using a wireless charging technology.

The portable terminal 100 can have at least one touch screen to provide GUIs for various services (such as call, data communication, broadcasting, photography and the like). Each of the alt least one touchscreen can send an analog signal corresponding to at least one touch input to the user interface to the touchscreen controller 195. The portable terminal 100 can have multiple touch screens and corresponding multiple touch screen controllers, each of which can receive an analog signal generated according to a touch on the corresponding touch screen. The at least one touch screen can be connected to a plurality of housings with hinges, or can be placed in a single housing without hinges. In an embodiment, the portable terminal 100 can have a single touch screen such as the touch screen 190.

The touch screen 190 can receive the at least one touch from user's physical contact (such as with fingers including thumb) or via a touchable input unit 168 (such as a stylus pen or an electronic pen). The touch screen 190 can also include a pen recognition panel 191 configured to recognize an input from a pen such as the stylus pen or the electronic pen. The pen recognition panel 191 can determine a distance between the pen and the touch screen 190 based on magnetic fields. The touch screen 190 can receive consecutive moves of one of the at least one touch. The touch screen 190 can send an analog signal corresponding to the consecutive moves of the input touch to the touchscreen controller 195.

The term 'touch' can be construed to include not only the contact touch but also contactless touch (such as keeping a detectable distance less than 1 mm) between the touch screen 190 and the user's body or the touch input unit. The detectable distance from the touchscreen 190 can vary depending on the performance or structure of the portable terminal 100, and in particular, the touchscreen 190 can output different values (such as analog current values) for touch detection and hovering detection to distinguishably detect a touch event occurred by a contact with the user's body or the touch input unit and a contactless input (such as a hovering event). Furthermore, the touch screen 190 can output different values (such as current values) for hovering detection over distance between where the hovering event occurs and the touch screen 190.

The touch screen 190 can be implemented in such as a resistive method, capacitive method, infrared method, or acoustic wave method.

The touch screen 190 can include at least two touch screen panels configured to detect touches or proximity of the user's body or the touch input unit to receive inputs of the user's body and the touch input unit simultaneously or sequentially. The at least two touchscreen panels can provide different output values to the touch screen controller 195, and the touch screen controller 195 can differentiate inputs made by the user's body and inputs made by the touch input unit on the touch screen 190 by differently recognizing the values input from the at least two touch screen panels. The touch screen 190 can display at least one or more objects. The touch screen 190 can apply a bounce effect or visual feedback (such as rippling effect, shaking, and the like) for at least one object located on top, bottom, leftmost, or rightmost part of the touch screen 190 from scrolling of the input unit 168, under control of the controller 110.

More specifically, the touch screen 190 can be formed in a layered structure in which a panel to detect an input made by the input unit 168 based on a change in induced electromotive force and a panel to detect a contact of the user's finger with the touch screen 190 can be close to each other or partly kept at a distance from each other. The touch screen 190 can include lots of pixels to display an image. The touch screen 190 can use Liquid Crystal Displays (LCDs), Organic Light Emitting Diodes (OLEDs), Light Emitting Diodes (LEDs), and the like.

The touch screen 190 can also include a plurality of sensors for detecting where the input unit 168 is on the touch screen 190 when the input unit 168 touches or approaches the touch screen 190 within a predetermined distance. Each of the plurality of sensors can have a coil structure and a sensor layer formed of the plurality of sensors having predetermined patterns of the sensors forming a plurality of electrode lines. With at least this structure, when the input unit 168 touches or hovers over the touch screen 190, the touch screen 190 can generate a sensing signal having waveforms changed due to magnetic fields between the sensor layer and the input unit 168 and send the sensing signal to the controller 110. When the touch screen 190 is contacted by a finger, the touch screen 190 can send the controller 110 a sensing signal due to capacity change. The predetermined distance between the input unit 168 and the touch screen 190 can be determined based on strength of a magnetic field created around the coil 510.

The touch screen controller 195 can convert the analog signal received from the touch screen 190 to a digital signal (such as XY coordinates) and transmit the digital signal to the controller 110. The controller 110 can control the touch screen 190 by using the digital signal received from the touch screen controller 195. For example, the controller 110 can select or execute a shortcut icon or an object that is displayed on the touch screen 190 in response to the touch event or the hovering event. The touch screen controller 195 can also be included in the controller 110.

Further, the touch screen controller 195 can determine the distance between where the hovering event occurs and the touch screen 190 by detecting a value (such as a current value) output through the touch screen 190, convert the determined distance to a digital signal (such as in Z coordinate), and provide the digital signal to the controller 110.

Figure 2:
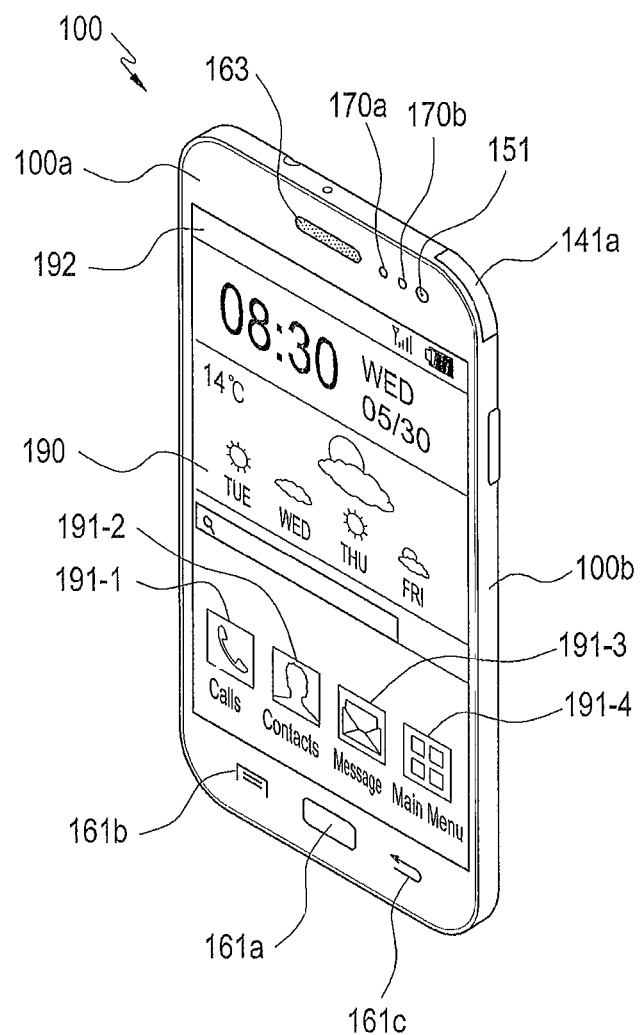
FIG. 2 is an example perspective view of the front face of a portable terminal according to this disclosure.
Figure 3:
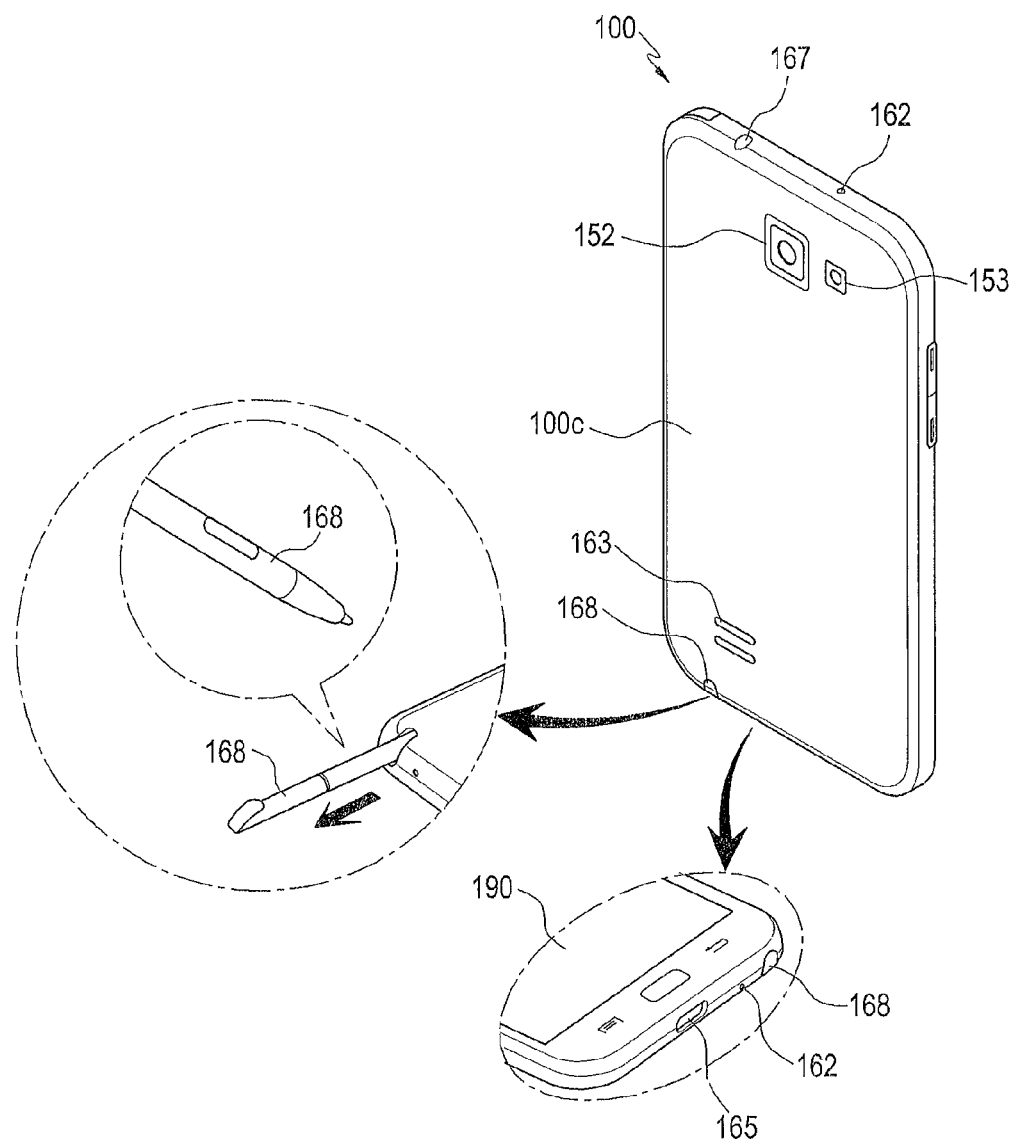
FIG. 3 is an example perspective view of the back face of a portable terminal according to this disclosure.

FIG. 2 is an example perspective view of the front face of a portable terminal according to this disclosure, and FIG. 3 is an example perspective view of the back face of a portable terminal according to this disclosure.

Referring to FIGS. 2 and 3, the touch screen 190 can be arranged in the middle of the front face 100*a* of the portable terminal 100. The touch screen 190 can be formed to take up a major portion of the front face 100*a* of the portable terminal 100. In FIG. 2, the touch screen 190 can display an exemplary main home screen. The main home screen can be a first screen to be displayed on the touch screen 190 when the portable terminal 100 is powered on. In an embodiment, the portable terminal 100 can have several pages of different home screens, the main home screen can be the first of the several pages of home screens. In the main home screen, shortcut icons 191-1, 191-2, 191-3 for running frequently-used applications, a main menu key (also referred to as App key) 191-4, a time indicator, a weather indicator, etc. can be displayed. If selected, the main menu key 191-4 can display a menu screen on the touchscreen 190. In an upper part of the touchscreen 190, there can be a status bar 192 in which to display statuses of the portable terminal 100, such as a battery charging state, intensity of received signals, current time, and the like.

In a lower part of the touch screen 190, there can be a home button 161a, a menu button 161b, and a back button 161c arranged.

The home button 161a can be configured to display the main home screen on the touch screen 190. For example, if the home button 161a is touched while any home screen other than the main home screen or a menu screen is displayed in the touch screen 190, the main home screen can be displayed on the touch screen 190. Furthermore, while applications can be running on the touch screen 190, if the home button 191a is touched, the main home screen, as shown in FIG. 2, can be displayed on the touch screen 190. The home button 161a can also be used to display recently used applications or a task manager on the touch screen 190.

The menu button 161b can provide a link menu that can be used on the touch screen 190. The link menu can include a widget addition menu, background change menu, search menu, edit menu, environment setting menu, and the like.

The back button 161c, when touched, can display a screen that was displayed right before the current screen or can stop a most recently used application.

On the edge of the front face 100a of the portable terminal 100, the first camera 151, the illumination sensor 170a, and the proximity sensor 170b can be placed. On the back face 100c of the portable terminal 100, the second camera 152, the flash 153, and the speaker 163 can be placed.

On the side 100b of the portable terminal 100, such as a power/reset button 160a, a volume button 160b, a terrestrial DMB antenna 141a for broadcast reception, one or more microphones 162, etc. can be placed. The DMB antenna 141a can be fixed to the portable terminal 100, or can be detachably arranged.

On the lower side of the portable terminal 100, the connector 165 can be formed. The connector 165 can have a number of electrodes and can connect the electronic device 100 to an external device via a cable. On the upper side of the portable terminal 100, the headset jack 167 can be formed. The headset jack 167 can have a headset inserted thereto.

The input unit 168 can be equipped on the lower side of the portable terminal 100. The input unit 168 can be inserted and kept inside of the portable terminal 100 and be drawn out and detached from the portable terminal 100 for use.

Figure 4:
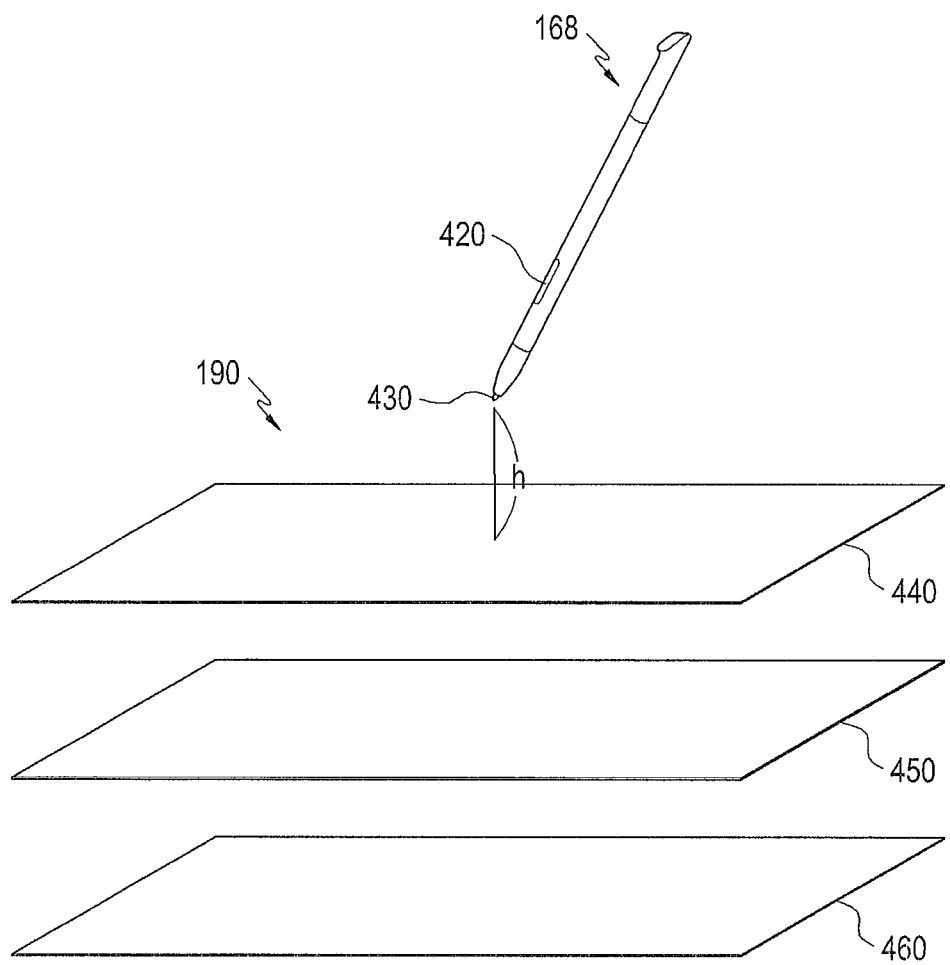
FIG. 4 illustrates an example input unit and a sectional view of an example touch screen according to this disclosure.

FIG. 4 illustrates an example input unit and an example touch screen in section according to this disclosure.

Referring to FIG. 4, the touch screen 190 can include a first touch panel 440, a display panel 450, and a second touch panel 460. The display panel 450 can be an LCD panel, an Active Matrix Organic Light Emitting Diodes (AMOLED) panel, and the like displaying various operating states of the portable terminal 100, various images resulting from applications and services, and a plurality of objects.

The first touch panel 440 can be a capacitive touch panel obtained by coating both sides of a glass with a metal conductive material, such as Indium Tin Oxide (ITO) film to conduct a current on the surface of the glass, which can be coated again with a dielectric substance to hold charges. Upon a touch of the user's finger on the surface of the first touch panel 440, a certain amount of charges can move to where the touch is made due to static electricity and the first touch panel 440 detects where the touch is made by recognizing a change in current due to the movement of the certain amount of charges. All the touches that can generate static electricity can be detectable through the first touch panel 440.

The second touch panel can be an Electronic Magnetic Resonance (EMR) touch panel, including an electromagnetic inductive coil sensor having a grid structure in which a plurality of loop coils are arranged in a predetermined first direction and a second direction intersecting the first direction, and an electronic signal processor configured to sequentially providing an alternate current (AC) signal with a predetermined frequency to the loop coils of the electromagnetic inductive coil sensor. If the input unit 168 having a resonant circuit approaches the second touch panel, a magnetic field generated from the corresponding loop coil can induce a current in the resonant circuit of the input unit 168 based on mutual electromagnetic induction. Based on the current, an inductive magnetic field can be generated from a coil of the resonant circuit of the input unit 168 and the portable terminal 100 can detect a hovering position, a touch position of the input unit 168, and a height (h) from the first display panel 440 to the tip 430 of the input unit 168 by detecting the inductive magnetic field from the loop coil in a receiving state. People having ordinary skill in the art can understand that the height (h) from the first display panel 440 to the tip 430 of the input unit 168 can vary depending on the performance or structure of the portable terminal 100. Hovering and touch events made by any input unit that can induce a current based on electromagnetic induction can be detected on the second touch panel 460. In an embodiment, the second touch panel 460 can be dedicated to detect the hovering or touch event by the input unit 168. The input unit 168 can also be referred to as an electromagnetic pen or an EMR pen. The input unit 168 can be different from typical pens that do not have resonant circuits nor are detected by the first touch panel 440. The input unit 168 can be configured to have a button 420 to change electromagnetic induction values generated by a coil placed inside of the body of the input unit 168 and adjacent to the tip 430 of the body. Detailed description of the input unit 168 can be provided later in connection with FIG. 5.

The touch controller 195 can include a first touch panel controller and a second touch panel controller. The first touch panel controller can convert an analog signal received from the first touch panel 440 upon detection of the user's finger to a digital signal (such as in X, Y, and Z coordinates) and send the digital signal to the controller 110. The second touch panel controller can convert an analog signal received from the second touch panel 460 upon detection of hovering or touch of the input unit 168 to a digital signal and send the digital signal to the controller 110. The controller 110 can use the digital signal received from each of the first and second touch panel controllers to control the first display panel 440, the touch panel 450, or the second touch panel 460. For example, the controller 110 can display a screen in a predetermined form on the display panel 440 in response to the hovering or touch of the finger, the pen, or the input unit 168.

In an embodiment, the first touch panel can detect a touch of the user's finger or a pen while the second touch panel detects hovering or touches by the input unit 168. The controller 110 of the portable terminal 100 can thus discriminatingly detect hovering or touches by the user's finger or pen from hovering or touches by the input unit 168. Although only one touch screen is illustrated in FIG. 4, embodiments disclosed herein are not limited only to one touch screen but can include a plurality of touch screens. Each touch screen can be included in a respective housing by being connected thereto with a hinge or a plurality of touch screens can be included in a single housing. Each of the plurality of touch screens can be configured to have a display panel and at least one touch panel, as shown in FIG. 4.

Figure 5:
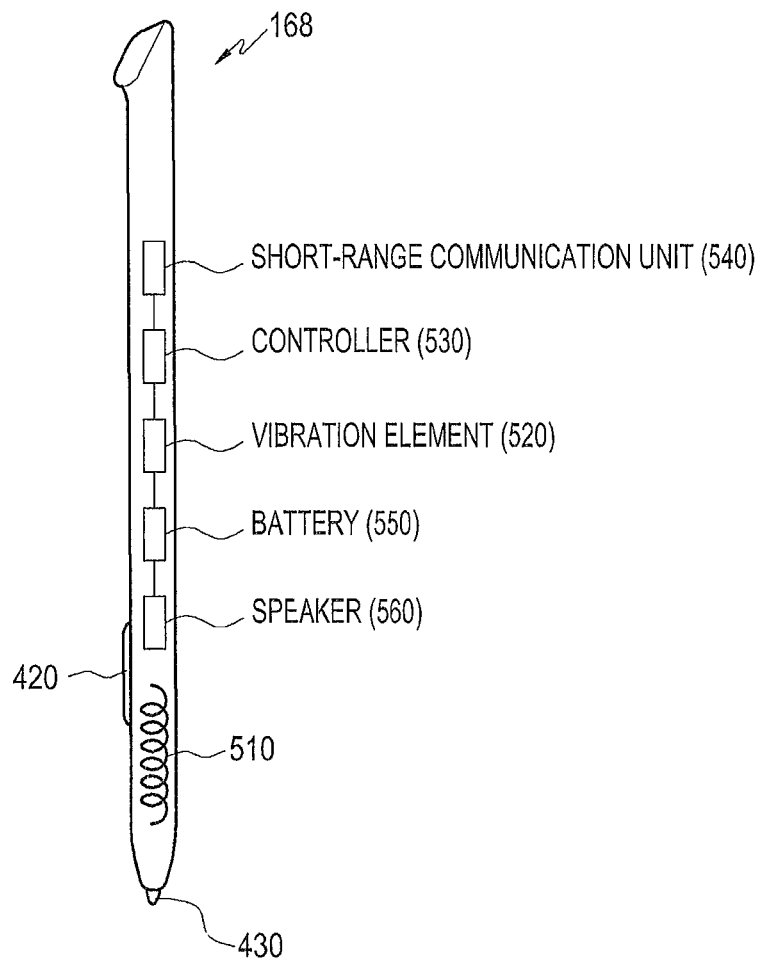
FIG. 5 is an example block diagram of an input unit according to this disclosure.

FIG. 5 is an example block diagram of an input unit according to this disclosure.

Referring to FIG. 5, the input unit 168, such as a touch pen can have a body in a pen shape with a pen point 430 on the tip of the body. Inside the body, the input unit 168 can include a coil 510 adjacent to the pen point 430, a vibration element 520 that can vibrate when a hovering effect occurs, a controller 530 that can analyze a control signal received from the portable terminal 100 due to the hovering event and can control vibrating intensity and vibration interval of the vibration element 520, a short-range communication unit 540 that can perform short-range communication with the portable terminal 100, and a battery 550 configured to supply power for vibration of the input unit 168. The input unit 168 can also include a button 420 to change electromagnetic induction values generated by the coil 510. The input unit 168 can also include a speaker 560 to output a sound according to the vibration interval and/or the vibrating intensity of the input unit 168.

The input unit 168 having the structure as used herein can be configured to support an electrostatic induction method. When a magnetic field is created by the coil 510 at a certain point on the touch screen 190, the touch screen 190 can be configured to detect the point of the magnetic field as a touch point.

More specifically, the speaker 560 can output sounds that correspond to various signals (such as radio signals, broadcast signals, digital audio files, or digital video files) from the mobile communication module 120, sub-communication module 130, or multimedia module 140 under control of the controller 530. The speaker 560 can also output sounds that correspond to functions performed by the portable terminal 100 (such as button press sounds or ringback tones). One or more speakers can be formed in a proper position or positions in the housing of the input unit 168.

Figure 6A:
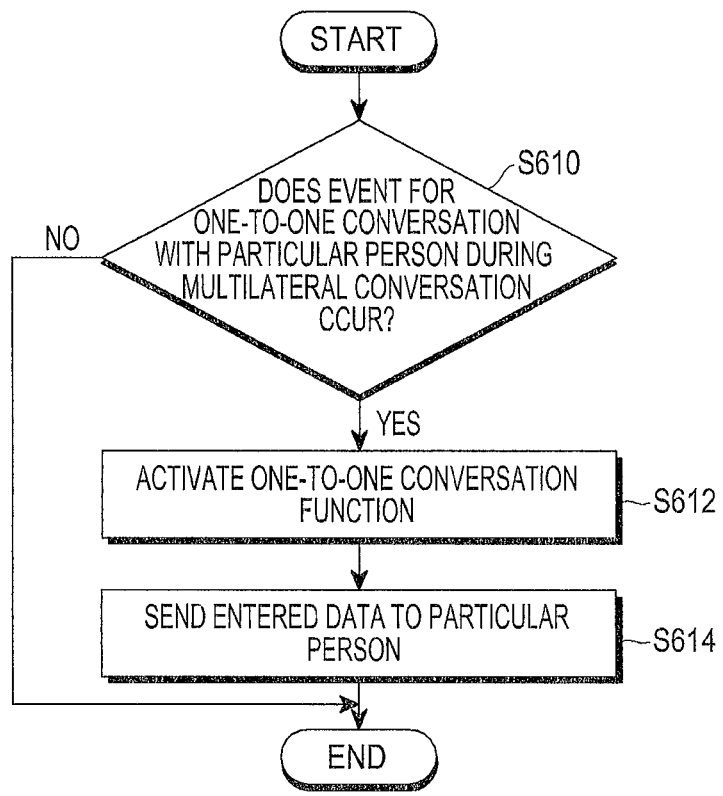
FIG. 6A is a flowchart illustrating an example method for controlling a multilateral conversation according to this disclosure.

FIG. 6A is a flowchart illustrating an example method for controlling a multilateral conversation according to this disclosure.

Referring to FIG. 6A, the example method for controlling a multilateral conversation can be described as follows.

When an event for one-to-one conversation with a particular person occurs during a multilateral conversation in operation S610, a one-to-one function can be activated in operation S612. Specifically, when an event for one-to-one conversation with a particular person occurs during a multilateral conversation, the portable terminal 100 can detect the event and accordingly activate the one-to-one conversation function. The event can include at least one of dragging a send button to send data to a particular person (or an icon of the particular person), touching an icon of the particular person, and dragging the icon of the particular person to an input window. The icon of the particular person can include a photo or name to represent the person during the multilateral conversation or one-to-one conversation. The event can also include dragging the send button to the icon of the particular person after data to be sent to the particular person has been entered. In response to the event, the portable terminal 100 can activate the one-to-one conversation function to provide one-to-one conversation with a particular person selected from a multilateral conversation environment. Also, in response to the event, the portable terminal 100 can display an icon of the particular person in the input window. Furthermore, if a user wants to send data to some participants during the multilateral conversation, the user can activate a conversation function to communicate data with the participants by dragging the send button to respective icons of the participants or dragging the respective icons to the input window. At this time, respective icons of the participants can be displayed in the input window. If data is received from the particular person using a one-to-one conversation function, an icon to indicate the one-to-one conversation function can be displayed in the portable terminal 100 of the user along with the received data. The portable terminal 100 can activate a one-to-one conversation function to provide the one-to-one conversation with the particular person by dragging the icon to indicate the one-to-one conversation function into the input window.

The input window can be a window to receive data, such as text, a photo, a video, and an emoticon. In addition to the text, photo, video, and emoticon, the input window can receive various types of data to be sent to at least one person including the particular person. Furthermore, the portable terminal 100 can display a pop-up window if the icon of the particular person is touched or dragged into the input window. The pop-up window can include at least one of blocking the particular person, having one-to-one chat with the particular person, showing the user offline to the particular person, and sending a message to the particular person. In other words, the pop-up window can include various items for blocking the particular person, having a one-to-one conversation with the particular person, setting for the particular person to view the user offline, or sending a message to the particular person. However, the pop-up window are not limited thereto but can include various functions to be provided for the one-to-one conversation with the particular person.

In an embodiment, to stop or deactivate the activated one-to-one conversation function, the icon of the particular person dragged into the input window can be deleted or moved out of the input window.

In operation S614, entered data (which can be entered to the input window) can be sent to the particular person. To send the entered data to the particular person, the user can touch the send button or drag the send button to the icon of the particular person. Once the entered data is sent to the particular person, the data can be displayed in both the portable terminal 100 of the user and a portable terminal of the particular person. The data may not be displayed in other participants' terminals participating in the multilateral conversation. While displaying the data, the portable terminal 100 can additionally display an icon indicating the one-to-one conversation. The icon indicating the one-to-one conversation can be shaped like a lock or have any shape that can facilitate the user to recognize that this occasion corresponds to a private or one-to-one conversation. In an embodiment, the portable terminal 100 of the user can receive data through a one-to-one conversation function from a particular person, in which case the icon indicating the one-to-one conversation can be displayed in the portable terminal 100 along with the received data. To accept the one-to-one conversation of the particular person and then send a reply or data to the particular person, the user of the portable terminal 100 can activate the one-to-one conversation function by dragging the icon indicating the one-to-one conversation displayed with the data the particular person sent to the input window.

Figure 6B:
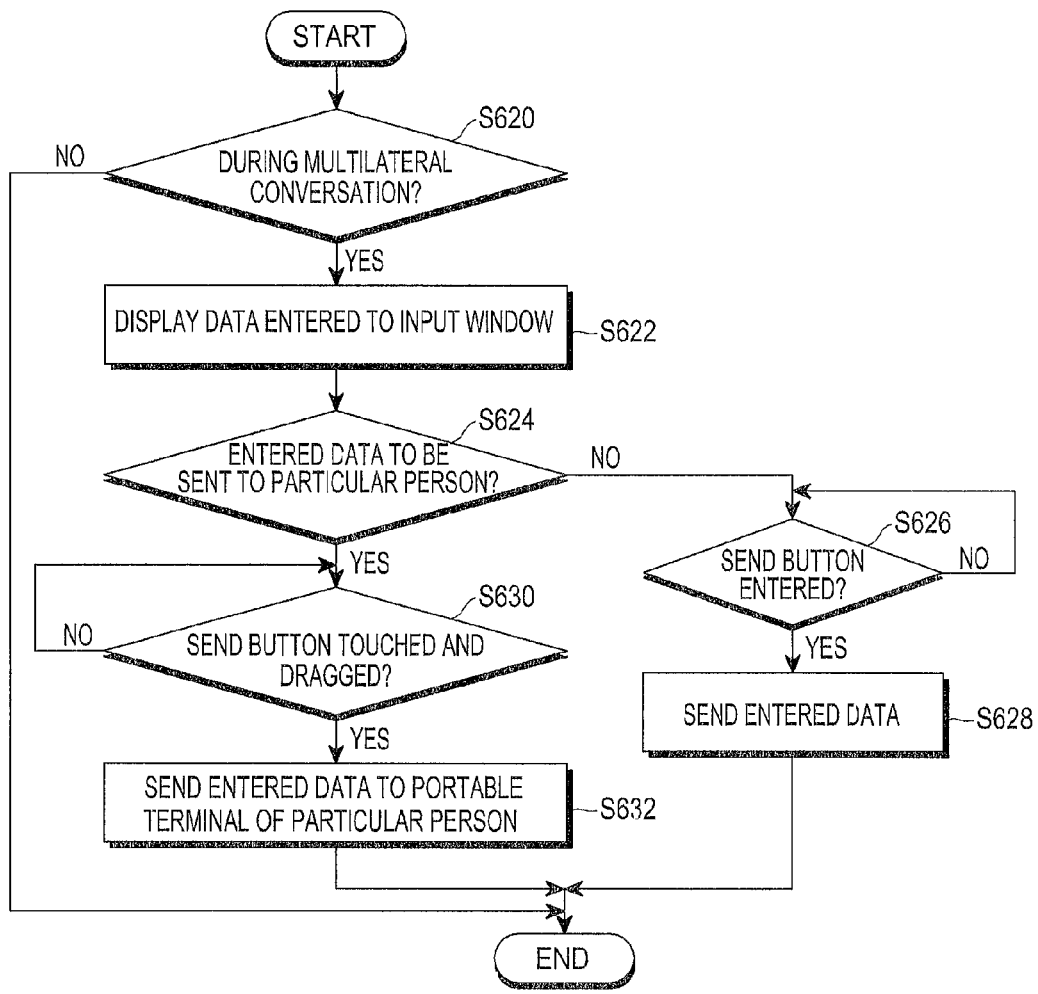
FIG. 6B is a flowchart illustrating an example method for providing one-to-one conversation with a particular person during a multilateral conversation according to this disclosure.

FIG. 6B is a flowchart illustrating an example method for providing one-to-one conversation with a particular person during a multilateral conversation according to this disclosure.

Referring to FIG. 6B, the example method for providing one-to-one conversation with a particular person during a multilateral conversation can be described as follows.

In operations S620 and S622, data entered to the input window during a multilateral conversation can be displayed. Specifically, if data such as text, a photo, a video, an icon, or an emoticon to be sent to participants of the multilateral conversation is entered to the input window, the data can be displayed in the multilateral conversation screen. For example, if text is entered, the text can be displayed in real time. If the entered data corresponds to a photo, a video, an icon or an emoticon, it can be displayed as a simple indication for the user to identify the data.

If the user wants to send the entered data not to the particular person but to the participants of the multilateral conversation, the user can send the entered data by entering the send button, in operations S624, S626, and S628. Once the send button is entered to view the entered data to the participants of the multilateral conversation in operation S622, the portable terminal 100 of the user can send the entered data to the participants.

If the user wants to send the entered data to the particular person in operation S624, an event of touching and dragging the send button to the particular person in operation S630, the portable terminal 100 can send the entered data to the portable terminal of the particular person in operation S632. The touch screen 190 can catch when the dragging event has begun and ended, under control of the controller 110. In an embodiment, a dragging function can be added to the send button and other various functions can be added to the send button depending on when the send button is touched. Specifically, if the send button is touched and dragged, the portable terminal 100 can recognize that data entered to the input window be sent to a participant of the multilateral conversation at an end point of the dragging. In an embodiment, if the send button is dragged, the portable terminal 100 can activate the one-to-one conversation function. With the one-to-one conversation function, the portable terminal 100 can send the entered data to the particular person during the multilateral conversation. Furthermore, during the multilateral conversation, the portable terminal 100 can send the entered data to a single participant, such as the particular person and to multiple participants of the multilateral conversation. In an embodiment, the portable terminal 100 can send entered data after activating the one-to-one conversation function in response to the dragging of the send button.

Figure 6C:
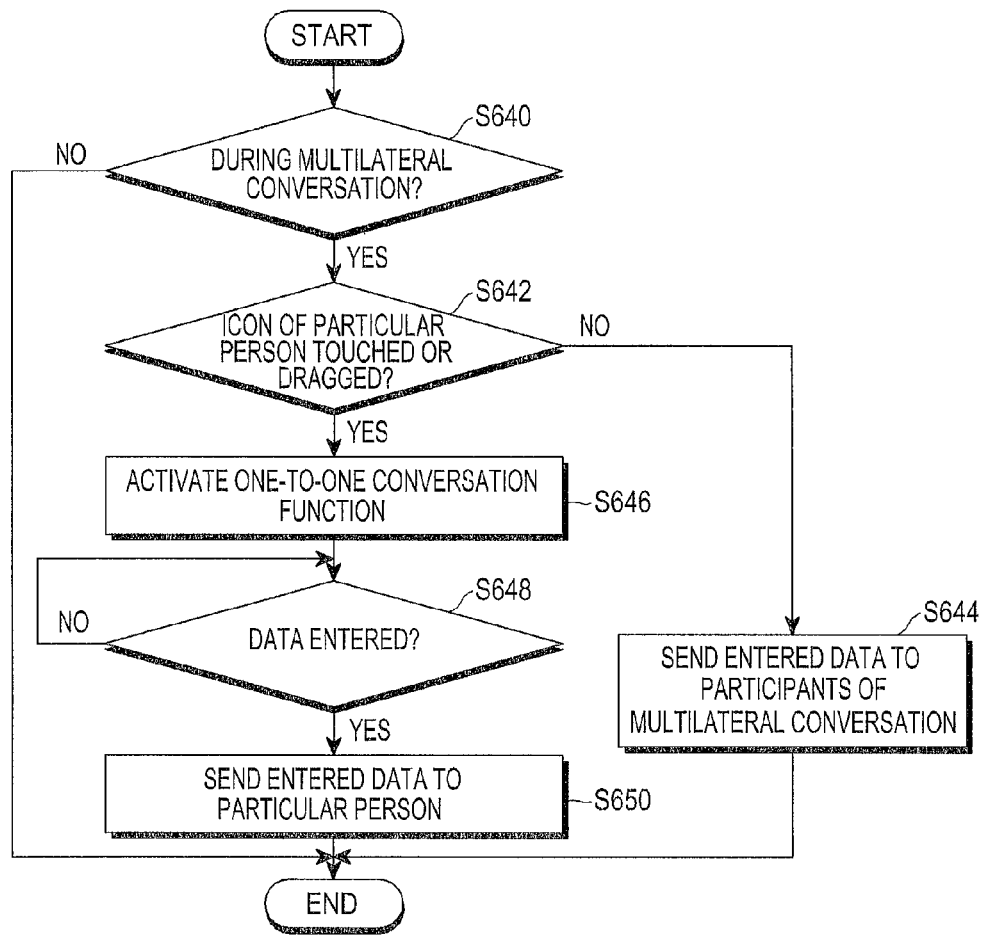
FIG. 6C is a flowchart illustrating an example method for providing one-to-one conversation with a particular person during a multilateral conversation according to this disclosure.

FIG. 6C is a flowchart illustrating an example method for providing one-to-one conversation with a particular person during a multilateral conversation according to this disclosure.

Referring to FIG. 6C, the example method for providing one-to-one conversation with a particular person during a multilateral conversation can be described as follows.

If there is no dragging or touching event upon an icon of a particular person during a multilateral conversation, the portable terminal 100 can determine that no one-to-one conversation has been activated and send entered data to participants of the multilateral conversation in operations S640, S642, and S644.

If there is a dragging or touching event on an icon of a particular person in operation S642, the portable terminal 100 can activate the one-to-one conversation function in operation S646. More specifically, if an icon of a particular person is dragged on the multilateral conversation screen, the portable terminal 100 can detect the dragging event. If the icon of the particular person is touched and dragged into the input window, the portable terminal 100 can determine that the dragging event corresponds to a command to execute one-to-one conversation with the particular person. Accordingly, the portable terminal 100 can activate the one-to-one conversation function. In an embodiment, if the user touches an icon of the particular person to talk personally, the portable terminal 100 can display a pop-up window on the touch screen. The pop-up window can be generated in response to the user touching the icon of the particular person or dragging the icon into the input window. The pop-up window can include various functions, such as blocking the particular person, sending a message to the particular person, and setting to show the user offline to the particular person. By displaying an indication that the one-to-one conversation function has been activated in a part of the touch screen or in a part of the multilateral conversation screen, the portable terminal 100 can enable the user to recognize that the one-to-one conversation function has been activated. Alternatively, a separate mark, icon, and the like, indicating that the one-to-one conversation function has been activated can be displayed around the icon of the particular person.

With the one-to-one conversation function activated in operation S646, if data is entered, the data can be sent to the terminal of the particular person in operations S648 and S650.

Specifically, if data such as text, a photo, a video, an icon, or an emoticon to be sent to the particular person participating in the multilateral conversation is entered, the data entered to the input window can be displayed. To send the entered data, the user can drag the icon of the particular person to the send button or into the input window. Alternatively, to send the entered data, the user can drag the send button to the icon of the particular person.

Once the entered data is sent to the particular person, the data can be displayed in both the portable terminal 100 of the user and the portable terminal of the particular person. The data may not be displayed in terminals of other participants of the multilateral conversation than the user and the particular person. While displaying the data sent, the portable terminal 100 can incorporate an icon indicating the one-to-one conversation to the data sent and display the icon with the data. In an embodiment, the portable terminal 100 of the user can receive data through a one-to-one conversation function from a particular person, in which case the icon indicating the one-to-one conversation can be displayed in the portable terminal 100 along with the received data. To accept the one-to-one conversation of the particular person and then send a reply or data to the particular person, the user of the portable terminal 100 can activate the one-to-one conversation function by dragging the icon indicating the one-to-one conversation displayed with the data the particular person sent to the input window.

Figure 7A:
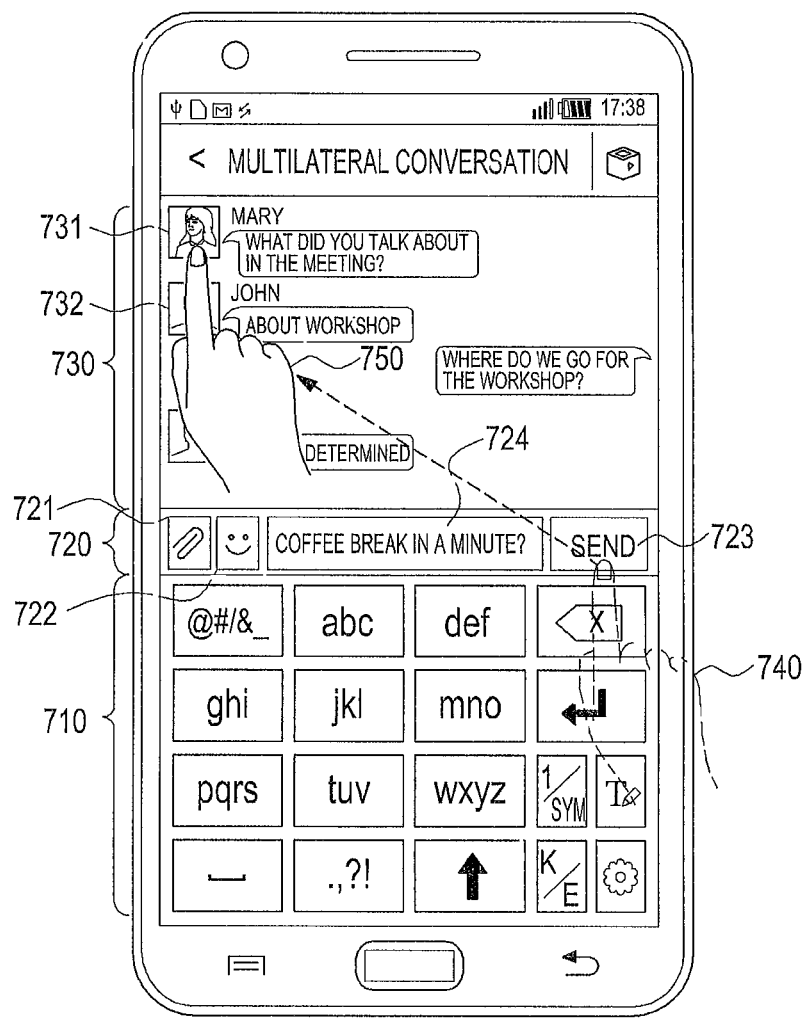
FIG. 7A illustrates an example screen in which a send button is dragged to have one-to-one conversation with a particular person during a multilateral conversation according to this disclosure.
Figure 7B:
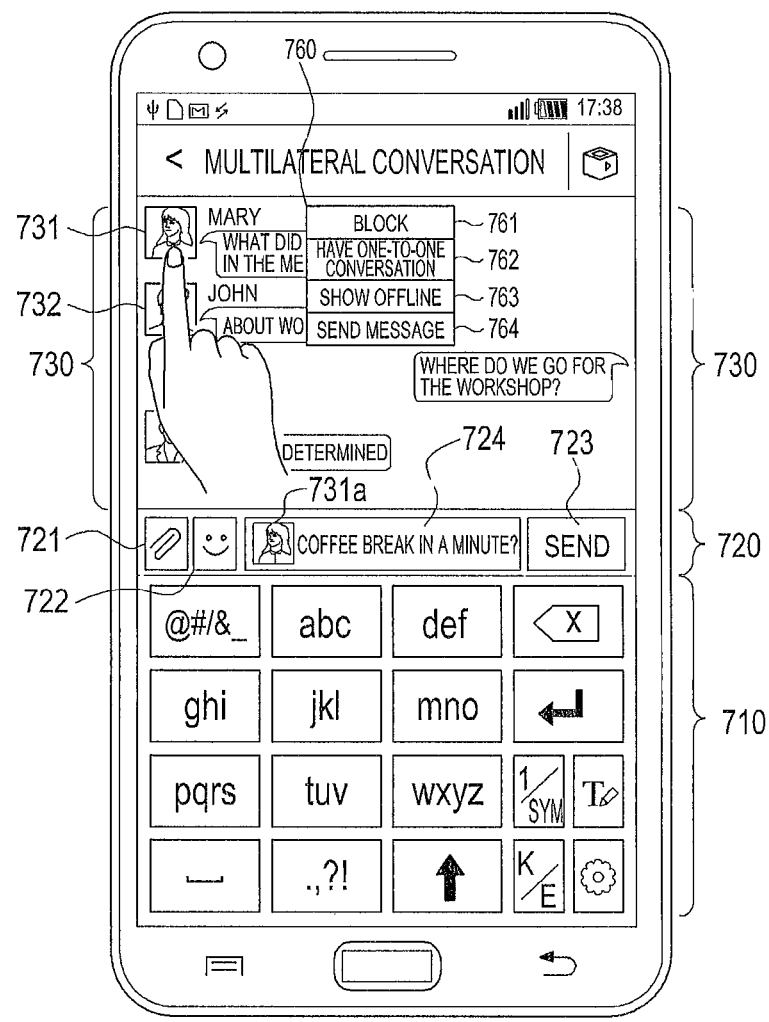
FIG. 7B illustrates an example screen in which an icon of a particular person is touched to have one-to-one conversation with a particular person during a multilateral conversation according to this disclosure.
Figure 7C:
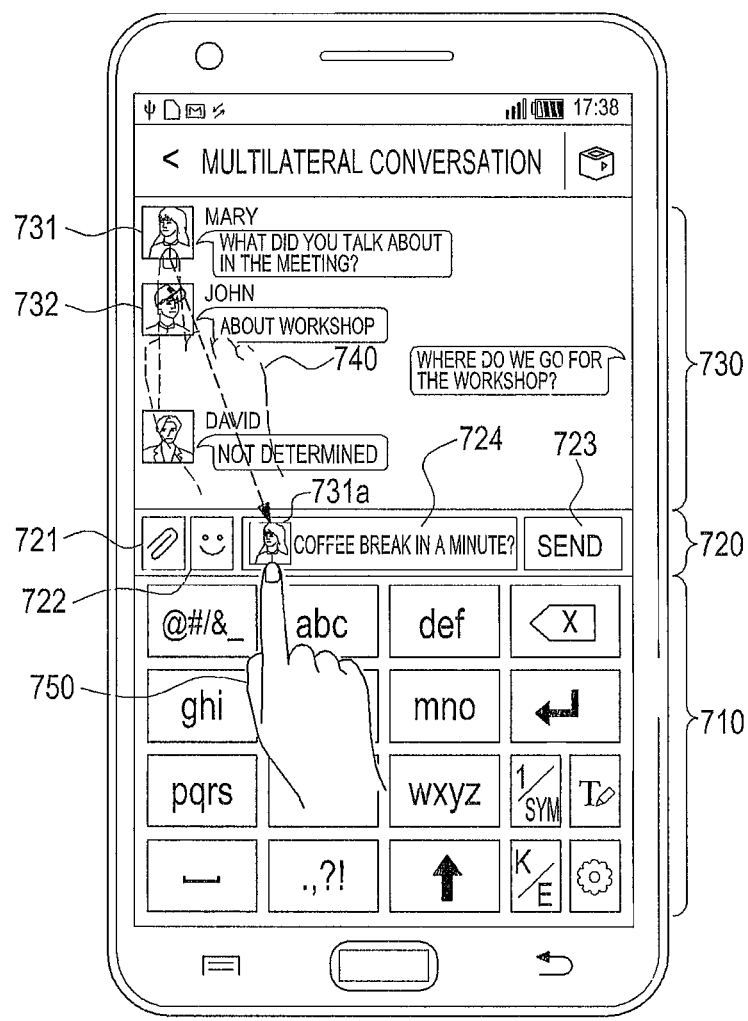
FIG. 7C illustrates an example screen in which an icon of a particular person is dragged to have one-to-one conversation with a particular person during a multilateral conversation according to this disclosure.
Figure 7D:
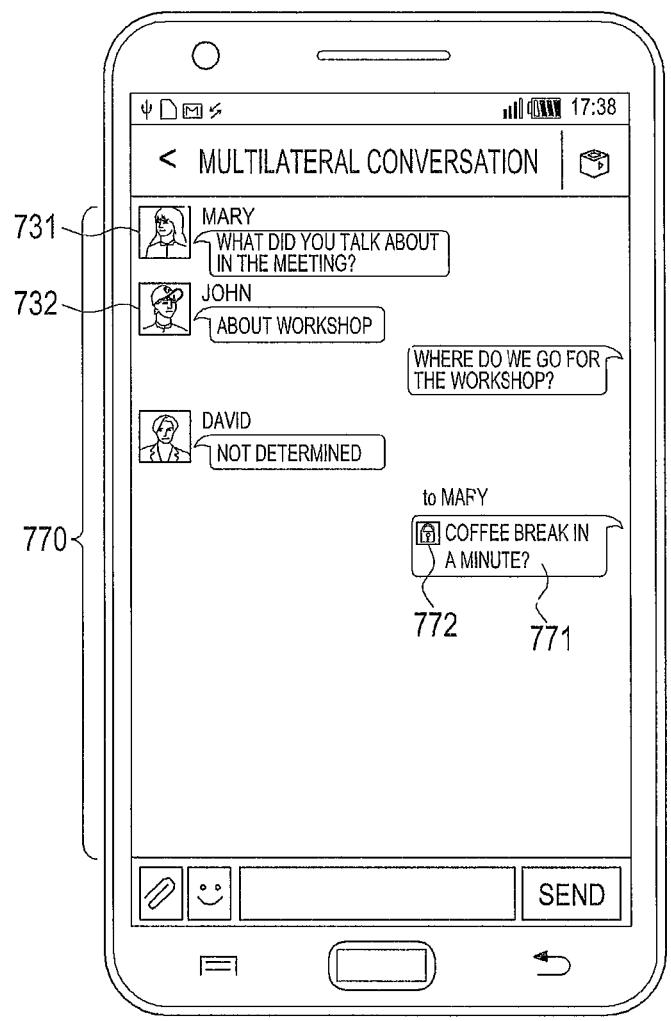
FIG. 7D illustrates an example screen resulting from data communication to a particular person during a multilateral conversation according to this disclosure.
Figure 7E:
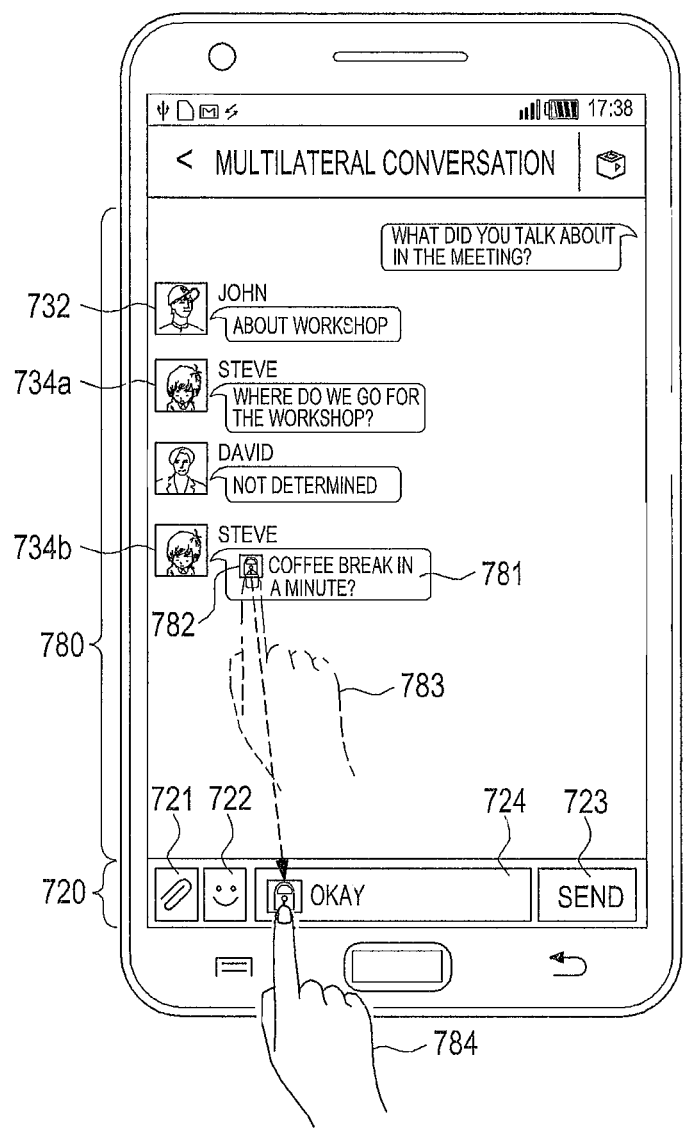
FIG. 7E illustrates an example multilateral conversation screen on the side of a particular person according to this disclosure.

FIG. 7A illustrates an example screen in which a send button is dragged to have one-to-one conversation with a particular person during a multilateral conversation according to this disclosure. FIG. 7B illustrates an example screen in which an icon of a particular person is touched to have one-to-one conversation with the particular person during a multilateral conversation according to this disclosure. FIG. 7C illustrates an example screen in which an icon of a particular person is dragged to have one-to-one conversation with the particular person during a multilateral conversation according to this disclosure FIG. 7D illustrates an example screen resulting from data communication to a particular person during a multilateral conversation according to this disclosure. FIG. 7E illustrates a multilateral conversation screen on the side of a particular person according to this disclosure.

Referring to FIGS. 7A to 7E, the method for controlling a multilateral conversation can be described as follows.

The touch screen of a portable terminal, such as the portable terminal 100 in accordance with the embodiment of the present disclosure can include a keypad area 710, a data input area 720, and a conversation area 730. The keypad area 710 can enable a user to input various text, such as Korean letters, English letters, symbols, and the like, and the data input area 720 can enable data to be selected, input, or sent. The data input area can include a data selection button 721 for selecting data, an emoticon button 722 for selecting an emoticon or character, an input window 724 for receiving data (such as text, emoticons, characters, and the like), and a send button 723 for sending entered data. The conversation area 730 can display data exchanged during a one-to-one conversation or a multilateral conversation.

Referring to FIG. 7A, a screen in which a send button can be dragged to have one-to-one conversation with a particular person during a multilateral conversation is illustrated, and the multilateral conversation has participants, such as Mary, John, David, and the user of the portable terminal. During this multilateral conversation, if the user wants to send data (such as "coffee break in a minute") to a particular person (such as Mary), the user can select the send button 723 with his/her finger 740 or an input unit and drag the send button 723 to where an icon 731 of the particular person, such as Mary, is located. In this case, the portable terminal can detect that dragging of the send button 723 has started and detect an end point of the dragging. The portable terminal can then activate the one-to-one conversation function with the particular person, Mary, whose icon can be located at the end point of the dragging, during the multilateral conversation. Then, the data, such as "coffee break in a minute?" entered to the input window 724 can be sent to the particular person, such as Mary. Likewise, during this multilateral conversation, if the user wants to send data (such as "coffee break in a minute") to a particular person (such as John), the user can select the send button 723 with his/her finger 740 or an input unit and drag the send button 723 to where an icon 732 of the particular person, John, is located. In this case, the portable terminal can detect that dragging of the send button 723 has started and can detect an end point of the dragging. The portable terminal can then activate the one-to-one conversation function with the particular person, John, whose icon is located at the end point of the dragging during the multilateral conversation. A group conversation among some participants (such as Mary, John, and the user) of the multilateral conversation can also be provided in addition to the one-to-one conversation with a particular person (such as Mary or John).

With the one-to-one conversation with the particular person, such as Mary activated during the multilateral conversation by dragging the send button 723 to the icon 731 of Mary, if data is entered to the input window 724 and the send button 723 is touched, the entered data can be sent to a portable terminal of the particular person, such as Mary.

As such, one-to-one conversation can be activated by dragging the send button 723 to where an icon of a particular person the user wants to have a chat privately is located. One-to-one conversation can also be activated even when dragging the send button 723 ends in an area that can correspond to the particular person. At least one of the size and location of the area can be adjusted.

FIG. 7B illustrates an example screen in which an icon of a particular person is touched to have one-to-one conversation with the particular person during a multilateral conversation according to this disclosure. If the icon 731 of a particular person, such as Mary is touched while data (such as "coffee break in a minute?") to be sent to the particular person, such as Mary, is entered to the input window 724, a pop-up window 760 can be displayed. The pop-up window 760 can include a block menu 761 for blocking the particular person, such as Mary, a one-to-one conversation menu 762 for serving one-to-one conversation with the particular person, such as Mary, a display menu 763 for showing the user offline to the particular person, such as Mary, and a message menu 764 for sending a message to the particular person, such as Mary. The portable terminal 100 can perform respective functions according to the menus provided by the pop-up window 760. For example, if the one-to-one conversation menu 762 is selected in the pop-up menu 760, the portable terminal 100 can activate the one-to-one conversation function with the particular person, such as Mary. Once the one-to-one conversation function is activated, an icon 731a of the particular person, such as Mary, can be displayed in the input window 724. After that, in response to the send button 723 being entered, the entered data can be sent to the particular person, such as Mary.

In an embodiment, to send data to a particular person, the data can be entered first and the particular person can then be selected, or conversely, the particular person can be selected first and the data to be sent to the particular person can then be entered.

For example, if the one-to-one conversation menu 762 is selected in the pop-up window 760 generated by touching the icon 731 of the particular person, such as Mary, the portable terminal can display a corresponding icon 731a of the particular person, such as Mary, in the input window 724. Then, the portable terminal 100 can activate the one-to-one conversation function with the particular person, such as Mary. In at least this case, a cursor can flicker in the input window 724 to receive data. When the send button 723 is selected after completion of data input, the data can be sent to the particular person, such as Mary.

Referring to FIG. 7C, an example screen in which an icon of a particular person is dragged to have one-to-one conversation with the particular person during a multilateral conversation is illustrated, and the multilateral conversation has participants, such as Mary, John, David, and the user of the portable terminal. During this multilateral conversation, if the user wants to have one-to-one conversation with a particular person, such as Mary, the user can touch the icon 731 of the particular person, such as Mary, with his/her finger 750 or an input unit and drag the icon 731 into the input window 724. Then, the portable terminal can detect that dragging of the icon 731 of the particular person, such as Mary, has begun and ended in the input window 724. The portable terminal can then activate one-to-one conversation function during the multilateral conversation with the particular person, such as Mary, having an icon from which the dragging has begun and can display an icon 731a corresponding to the particular person, such as Mary, in the input window 724. The portable terminal can send data (such as "coffee break in a minute?") entered to the input window 724 to the portable terminal of the particular person, such as Mary, in response to the send button 723 being touched.

FIG. 7D illustrates an example screen resulting from data communication to a particular person during a multilateral conversation according to this disclosure, and the data (such as "coffee break in a minute?") entered as shown in FIGS.

7A to 7C can be sent to the particular person, such as Mary. Once the data (such as "coffee break in a minute?") is sent to the particular person, such as Mary, the data can be displayed 771 in the conversation area 770. The portable terminal 100 can also display an icon 772 indicating that the data is sent through the one-to-one conversation function in the conversation area 770 along with the data 771, such as at least a part of top, bottom, left, and right of the data.

FIG. 7E illustrates an example multilateral conversation screen on the side of a particular person according to this disclosure, displaying data (such as "coffee break in a minute?") received through the one-to-one conversation with the user, such as Steve. The conversation area 780 of the terminal of the particular person, such as Mary, can display data, such as text exchanged among the participants of the multilateral conversation, such as John, Steve, David, and Mary herself. Data (such as "where do we go for the workshop?") sent from Steve 734*a* through the multilateral conversation can be viewed by all the participants, but data 781 can be viewed only by Mary herself. An icon 782 indicating that the one-to-one conversation function is activated can be displayed along with the data 781 received from Steve at any of top, bottom, left, and right of the data 781. If Mary wants to send a reply to the data 781 received from Steve, Mary can touch and drag the icon 782 into the input window 724 (moving positions from 783 to 784) and the icon 282 can then be displayed in the input window 724. Mary can enter a reply (such as "Okay") and select the send button 723 to send the reply to the portable terminal of the user, such as Steve.

Alternatively, to send the reply to Steve, Mary can touch and drag an icon 734*b* of Steve into the input window 724. If the icon 734*b* of Steve is touched, a pop-up window can be displayed in Mary's terminal. The pop-up window can include at least one of blocking the particular person, such as Steve, having one-to-one conversation with the particular person, such as Steve, showing the user (such as Mary) offline to the particular person, such as Steve, and sending a message to the particular person, such as Steve.

In an embodiment, data exchanged with a particular person during a multilateral conversation can be displayed on the multilateral conversation screen.

Figure 8A:
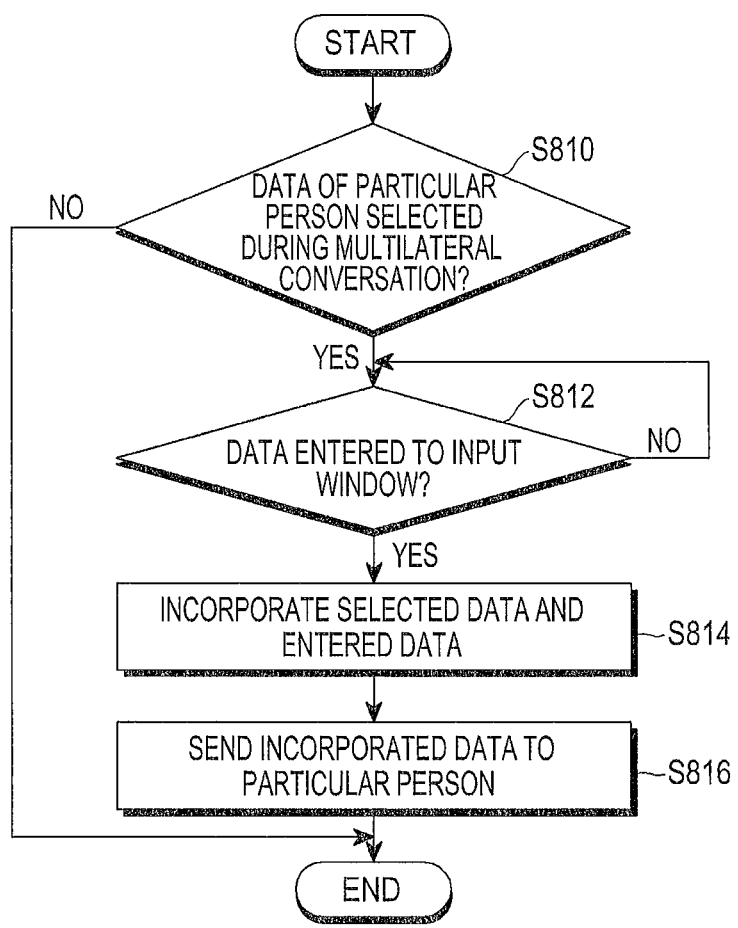
FIG. 8A is a flowchart illustrating an example method for controlling a multilateral conversation according to this disclosure.

FIG. 8A is a flowchart illustrating an example method for controlling a multilateral conversation according to this disclosure.

Referring to FIG. 8A, the method for controlling a multilateral conversation can be described as follows.

During a multilateral conversation, data of a particular person can be selected, and if data is entered to the input window, the selected data can be incorporated with the entered data, in operations S810, S812, and S814. The portable terminal 100 can activate a one-to-one conversation function with the particular person in response to the event of selecting the data sent from the particular person during the multilateral conversation. Once the data sent from the particular person is selected, the portable terminal 100 can store the data temporarily. The event of selecting the data sent from the particular person can include at least one of dragging the data into the input window, dragging the send button to send entered data to the data sent from the particular person, and dragging the data sent from the particular person to the send button. The event can also include dragging the send button to the data sent from the particular person while data to be sent to the particular person has been entered. When such an event occurs, the portable terminal 100 can activate the one-to-one conversation function with the particular person and display an icon of the particular person in the input window. The icon of the particular person can include a photo or name to represent the person during a multilateral conversation or a one-to-one conversation. If data is received from the particular person through the one-to-one conversation function, an icon to indicate the one-to-one conversation function can be displayed in the portable terminal 100 of the user along with the received data. If the icon to indicate the one-to-one conversation function is dragged to the input window, the portable terminal 100 can activate its own one-to-one conversation function to provide the one-to-one conversation with the particular person. The portable terminal 100 can incorporate the data entered to the input window with the selected data. For example, the selected data can include a question the particular person asks of participants of the multilateral conversation and the entered data can include an answer to the question. In an embodiment, the data of a question can be incorporated with the data of an answer in operation S814. By incorporating data corresponding to a question with data corresponding to an answer, the screen can enable both the questioner and the answerer to conveniently view the question and answer all together in one screen, which otherwise might not be viewed together in a screen due to talks exchanged among many participants of the multilateral conversation.

The data incorporated in operation S814 can be sent to the particular person in operation S816. Once the incorporated data is sent to the particular person, the incorporated data can be displayed in the multilateral conversation screen of both the portable terminal 100 of the user and the portable terminal of the particular person. In this case, only the user and the particular person can view the incorporated data. Furthermore, the incorporated data can include an icon indicating that the incorporated data has been sent through a one-to-one conversation function between the user and the particular person. The icon can be shaped like a lock. In an embodiment, the icon can have any other shape that can enable the user to recognize the one-to-one conversation or private conversation.

Figure 8B:
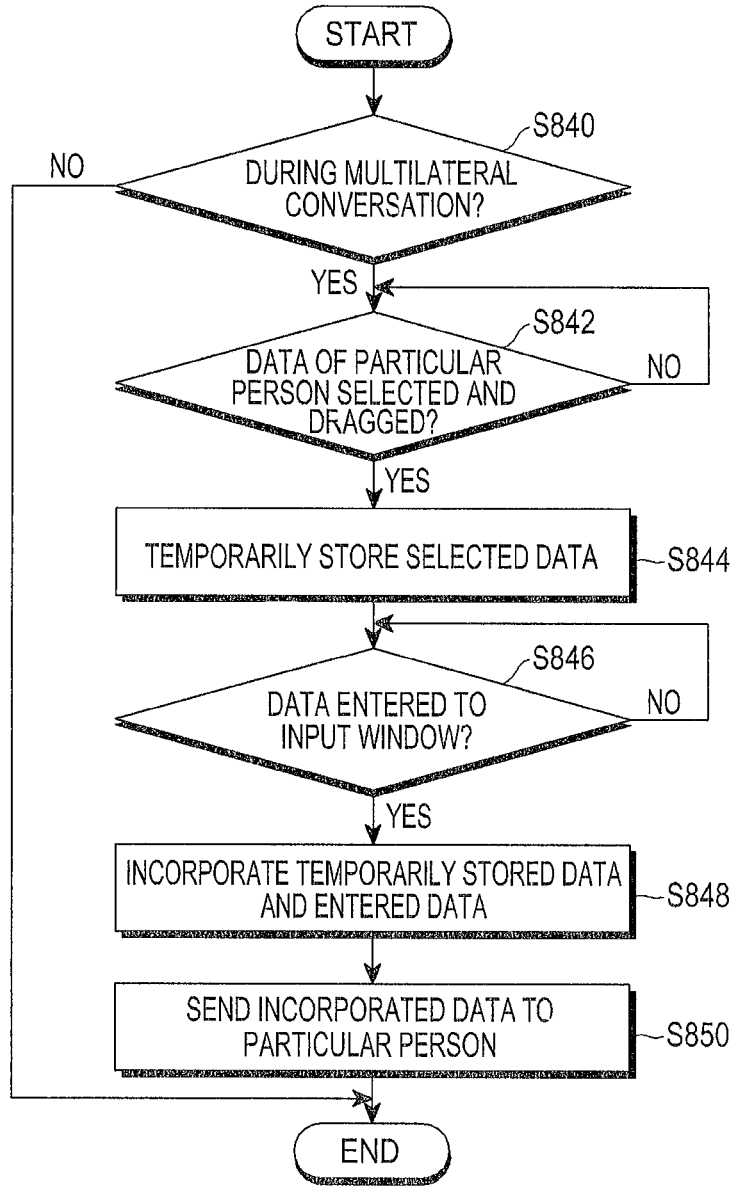
FIG. 8B is a flowchart illustrating an example method for providing one-to-one conversation with a particular person during a multilateral conversation according to this disclosure.

FIG. 8B is a flowchart illustrating an example method for providing one-to-one conversation with a particular person during a multilateral conversation according to this disclosure.

Referring to FIG. 8B, the method for providing one-to-one conversation with a particular person during a multilateral conversation can be described as follows.

During the multilateral conversation, if data of a particular person is selected and dragged, the selected data can be temporarily stored, in operations S840, S842, and S844. In response to the event of selecting and moving (such as dragging) the data of a particular person, the portable terminal 100 can activate a one-to-one conversation function with the particular person. The selected data sent from the particular person during the multilateral conversation can include text, a picture, an icon, an emoticon, or a video. The portable terminal 100 can display an icon of the particular person in the input window such that the user can recognize that entered data will be sent to the particular person. The portable terminal 100 can stop or inactivate the one-to-one conversation function in response to at least one of deleting the icon displayed in the input window and dragging the icon out of the input window. The event can include at least one of dragging data sent from the particular person into the input window, dragging the send button to send data input in the input window to the data sent from the particular person, and dragging the data sent from the particular person to the send button. The selected data can then be temporarily stored. The data temporarily stored can be incorporated with data entered to the input window and can be deleted when the incorporation is complete or the incorporated data is sent completely.

Once data is entered to the input window, the temporarily stored data and the data entered to the input window can be incorporated in operations S846 and S848. When the data sent from the particular person is dragged into the input window, an icon of the particular person can be displayed in the input window. A cursor can flicker in the input window to allow the user to enter data in the input window. Once data is entered to the input window in operation S846, the data temporarily stored in operation S844 or the selected data can be incorporated in operation S848.

For example, the selected data can include a question the particular person asks of participants of the multilateral conversation and the entered data can include an answer to the question. In an embodiment of the present disclosure, the data of a question can be incorporated with the data of an answer in operation S848.

The data incorporated in operation S848 can be sent to the particular person in operation S850. Once the incorporated data is sent to the particular person, the incorporated data can be displayed in the multilateral conversation screen of both the portable terminal of the user and the portable terminal of the particular person. In this case, only the user and the particular person can view the incorporated data. Furthermore, the incorporated data can include an icon indicating that the incorporated data has been sent through a one-to-one conversation function between the user and the particular person. The icon can be shaped like a lock. In an embodiment, the icon can have any other shape that can enable the user to recognize the one-to-one conversation or private conversation.

Figure 8C:
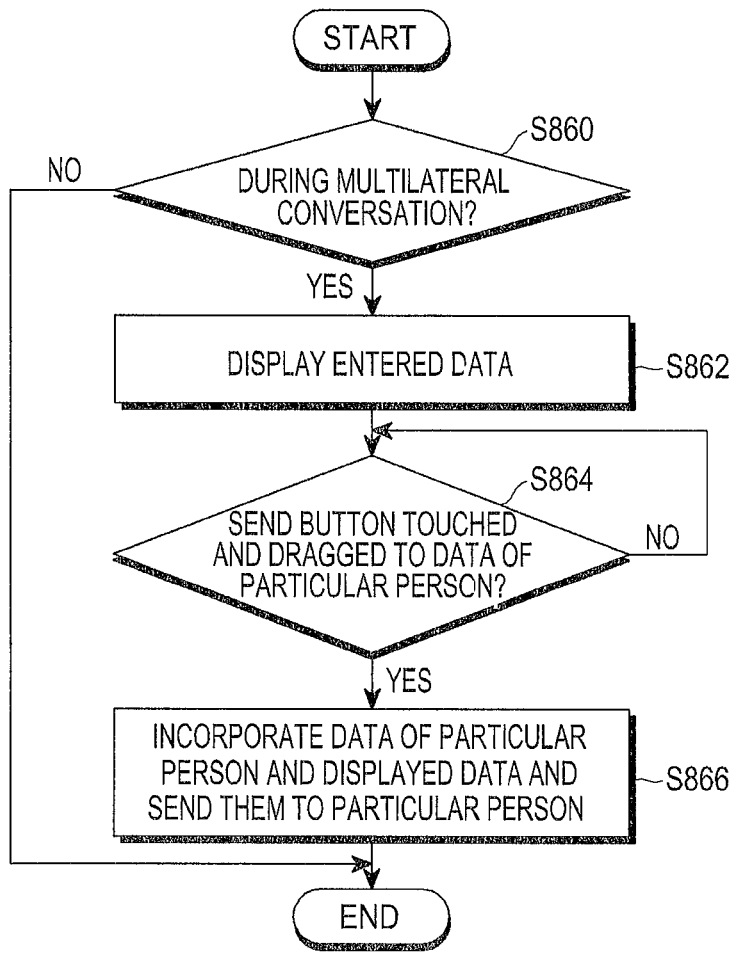
FIG. 8C is a flowchart illustrating an example method for providing one-to-one conversation with a particular person during a multilateral conversation according to this disclosure.

FIG. 8C is a flowchart illustrating an example method for providing a one-to-one conversation with a particular person during a multilateral conversation according to this disclosure.

Referring to FIG. 8C, the method for providing one-to-one conversation with a particular person during a multilateral conversation can be described as follows.

Data being entered during a multilateral conversation can be displayed in operations S860 and S862. The data can be entered before or after activation of a one-to-one conversation function.

When the send button is touched and dragged to data of a particular person in operation S864, the data of the particular person and the displayed entered data can be incorporated and sent to the particular person in operation S866. If an event of dragging the send button to a point where data sent from the particular person, which is wanted for incorporation, is located occurs after completion of data input, the one-to-one conversation function can be activated and the entered data and the selected data can then be incorporated and sent to the particular person. The event can also be replaced by an event of dragging data sent from the particular person into the input window and an event of dragging the data sent from the particular person to the send button. In response to an occurrence of such an event, an icon of the particular person can be displayed in the input window to indicate that the one-to-one conversation function has been activated.

Once the incorporated data is sent to the particular person, the incorporated data can be displayed in the multilateral conversation screen of both the portable terminal of the user and the portable terminal of the particular person. In this case, only the user and the particular person can view the incorporated data. Furthermore, the incorporated data can include an icon indicating that the incorporated data has been sent through a one-to-one conversation function between the user and the particular person. The icon can be shaped like a lock.

Figure 9A:
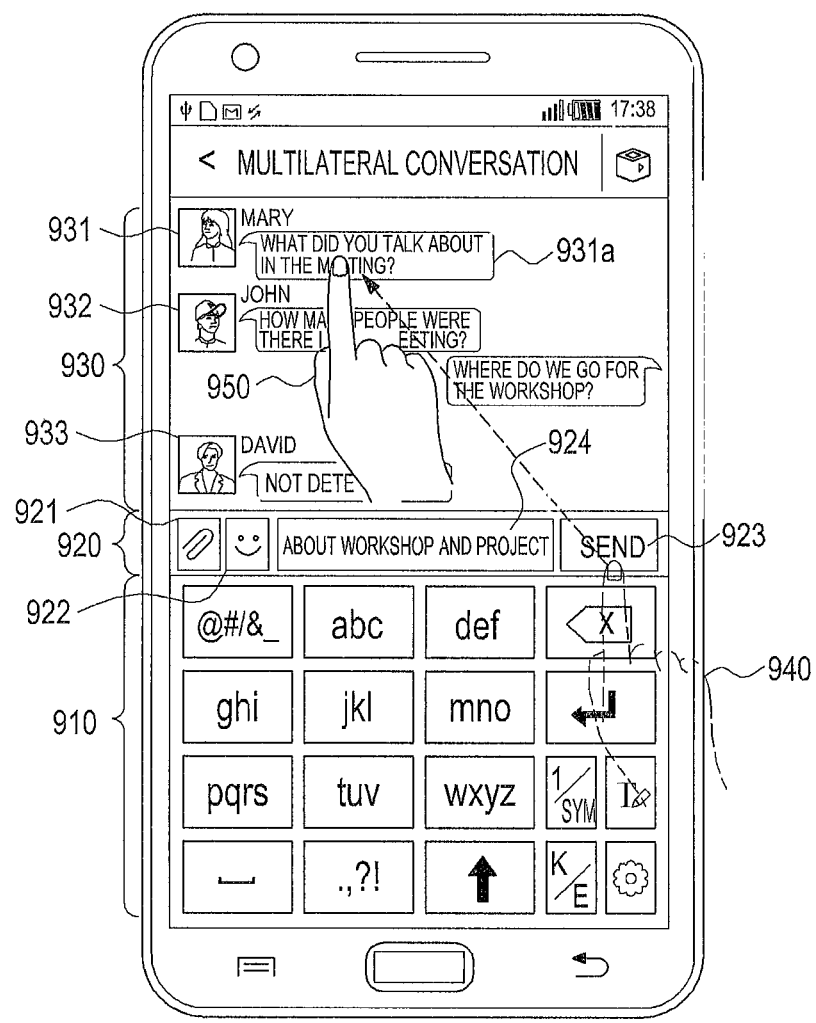
FIG. 9A illustrates an example screen in which a send button is dragged to have one-to-one conversation with a particular person during a multilateral conversation according to this disclosure.
Figure 9B:
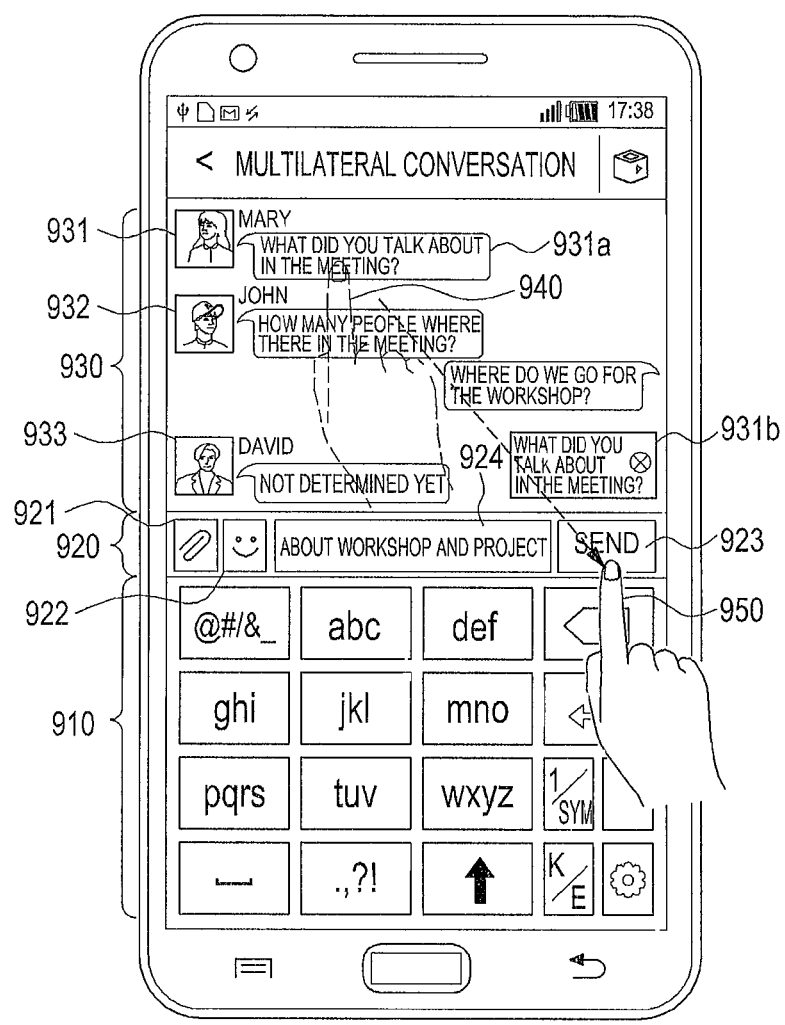
FIG. 9B illustrates an example screen in which chat data a particular person sent is dragged to have one-to-one conversation with the particular person during a multilateral conversation according to this disclosure.
Figure 9C:
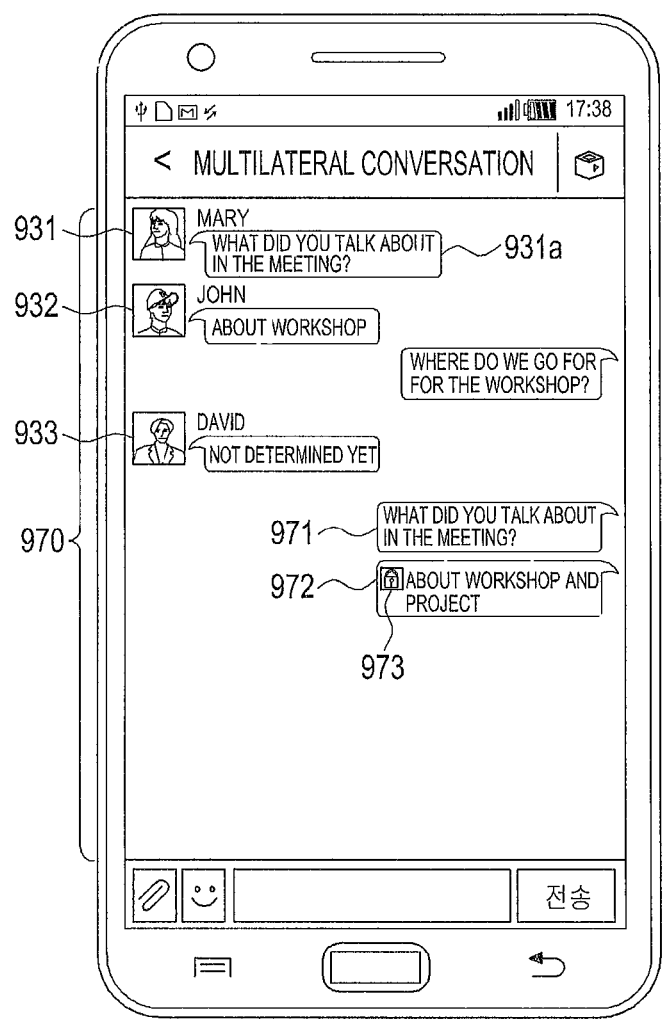
FIG. 9C illustrates an example screen resulting from data communication to a particular person during a multilateral conversation according to this disclosure.
Figure 9D:
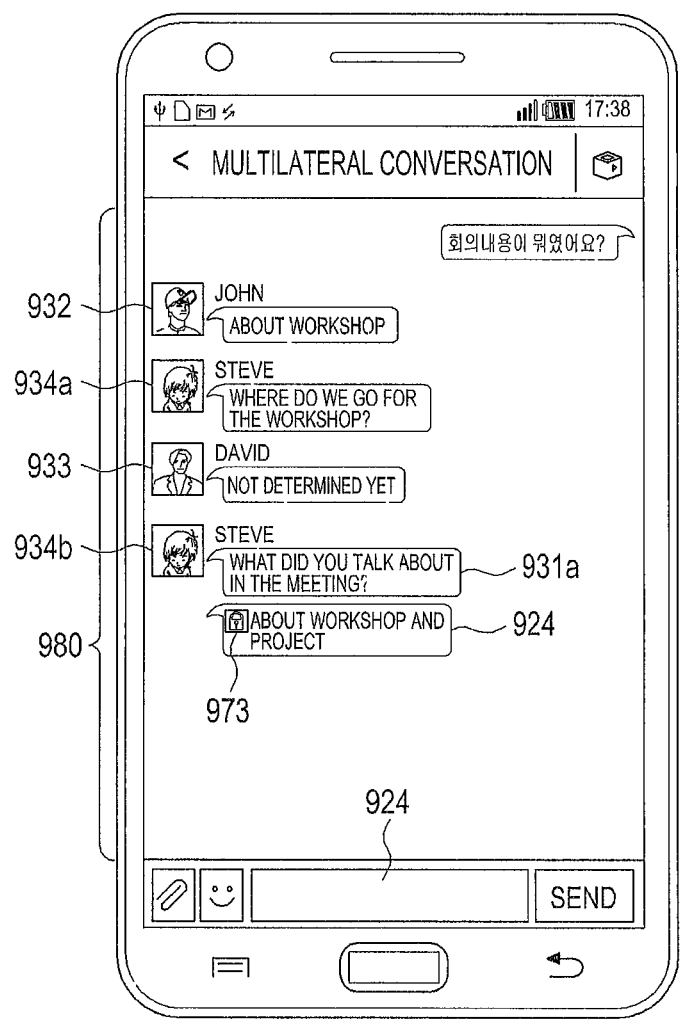
FIG. 9D illustrates an example multilateral conversation screen on the side of a particular person according to this disclosure.

FIG. 9A illustrates an example screen in which a send button is dragged to have one-to-one conversation with a particular person during a multilateral conversation according to this disclosure. FIG. 9B illustrates an example screen in which chat data a particular person sent is dragged to have one-to-one chat with the particular person during a multilateral conversation according to this disclosure. FIG. 9C illustrates an example screen resulting from data communication to a particular person during a multilateral conversation according to this disclosure. FIG. 9D illustrates an example multilateral conversation screen on the side of a particular person according to this disclosure.

Referring to FIGS. 9A and 9B, the method for controlling a multilateral conversation can be described as follows.

The touch screen of a portable terminal can include a keypad area 910, a data input area 920, and a conversation area 930. The keypad area 910 can enable a user to input various text, such as Korean letters, English letters, symbols, and the like, and the data input area 920 can enable data to be selected, input, or sent. The data input area can include a data selection button 921 for selecting data, an emoticon button 922 for selecting an emoticon or character, an input window 924 for receiving data (such as text, emoticons, characters, etc.), and a send button 923 for sending entered data. The conversation area 930 can display data exchanged during a one-to-one conversation or a multilateral conversation.

Referring to FIG. 9A, an example screen in which a send button is dragged to have one-to-one conversation with a particular person during a multilateral conversation is illustrated, and the multilateral conversation has participants, such as Mary, John, David, and the user of the portable terminal. During this multilateral conversation, if the user wants to send a reply (such as "about workshop and project") to a question (such as "what did you talk about in the meeting?") sent from a particular person, such as Mary, the user can select the send button 923 with his/her finger 940 or an input unit and drag the send button 723 to where data 931a sent from the particular person, such as Mary, or an icon 931 of the particular person, such as Mary, is located. In this case, the portable terminal can detect that dragging of the send button 923 has started and can detect an end point of the dragging. The portable terminal can then activate the one-to-one conversation function with the particular person whose icon is located at the end point of the dragging during the multilateral conversation. Then, the data, such as "about workshop and project" entered to the input window 924 can be sent to the particular person, such as Mary.

With the one-to-one conversation with the particular person, such as Mary, activated during the multilateral conversation by dragging the send button 923 to the data sent from Mary or the icon 931 of Mary, if data is entered to the input window 724 and then the send button 923 is touched, the entered data can be sent to the portable terminal of Mary.

As such, one-to-one conversation can be activated by dragging the send button 923 to where an icon of a particular person the user wants to have a chat privately is located. One-to-one conversation can also be activated even when dragging the send button 923 ends in an area that can correspond to the particular person. At least one of the size and location of the area can be adjusted.

Referring to FIG. 9B, an example screen in which data sent from a particular person is dragged to have one-to-one conversation with the particular person during a multilateral conversation is illustrated, and the multilateral conversation has participants, such as Mary, John, David, and the user of the portable terminal 100. During this multilateral conversation, if the user wants to have one-to-one conversation with a particular person, such as Mary, the user can touch the data (such as "what did you talk about in the meeting?") 931*a* sent from the particular person, such as Mary, with her finger 950 or an input unit and drag the data into the send button 923. Then, the portable terminal 100 can detect that dragging of the data, such as "what did you talk about in the meeting?" 931*a* sent form the particular person, such as Mary, has begun and ended at the send button 923. The portable terminal 100 can then activate the one-to-one conversation function with the particular person, such as Mary, from which the dragging has begun during the multilateral conversation, and can display an icon 931 of the particular person, such as Mary, in the input window 924. Alternatively, upon completion of dragging the data 931*a* sent from the particular person, such as Mary, to the send button 923, the portable terminal 100 can display a pop-up window 931*b* to enable the user to confirm the one-to-one conversation function with the particular person, such as Mary. For example, if the user changes his/her mind, the user can select a cancel button provided in the pop-up window 931*b* to cancel the dragging action. The portable terminal 100 can send data (such as "about workshop and project") entered into the input window 924 to the terminal of the particular person, such as Mary, in response to the send button 923 being touched.

FIG. 9C illustrates an example screen resulting from data communication to a particular person during a multilateral conversation according to this disclosure, the multilateral conversation having participants, such as Mary 931, John 932, David 933, and the user. Data (such as "about workshop and project") entered as shown in FIGS. 9A and 9B can be sent to Mary 931. Once the data (such as "about workshop and project") is sent to the particular person, such as Mary, using the one-to-one conversation function, the data can be displayed 971, 972 in the conversation area 970. The portable terminal 100 can also display an icon 973 indicating that the data is sent through the one-to-one conversation function in the conversation area 970 along with the data 917, 972, such as at one of top, bottom, left, and right of the data 971, 972.

FIG. 9D illustrates an example multilateral conversation screen on the side of a particular person according to this disclosure, displaying data (such as "about workshop and project") received through the one-to-one conversation with the user, such as Steve. The conversation area 980 of the terminal of the particular person, such as Mary can display data, such as text exchanged among the participants of the multilateral conversation, such as John 932, Steve, David 933, and Mary herself. Data (such as "where do we go for the workshop?") sent from Steve 934*a* through the multilateral conversation can be viewed by all the participants, but data 924 (such as "about workshop and project") can be viewed only by Mary herself. An icon 973 indicating that the one-to-one conversation function is activated can be displayed along with the data 931*a*, 924 received from Steve at any of top, bottom, left, and right of the data 931*a*, 924. If Mary who wants to send a reply to the data 931*a*, 924 received from Steve touches and drags the icon 973 into the input window, the icon 973 can be displayed in the input window.

Alternatively, to send the reply to Steve, Mary can touch and drag an icon 934*b* of Steve into the input window. If the icon 934*b* of Steve is touched, a pop-up window can be displayed in the Mary's portable terminal. The pop-up window can include at least one of blocking the particular person, such as Steve, having one-to-one conversation with the particular person, such as Steve, showing the user (such as Mary) offline to the particular person, such as Steve, and sending a message to the particular person, such as Steve.

In an embodiment, data exchanged with a particular person during a multilateral conversation can be displayed on the multilateral conversation screen.

In an embodiment, usefulness and convenience of a messenger service can increase by providing a private conversation with a particular person via a simple user interaction during a multilateral conversation in the messenger service.

It will be appreciated that the embodiments of the present disclosure can be implemented in hardware, software, or a combination of hardware and software. The software can be stored as program instructions or computer readable codes executable on the processor on a computer-readable medium. Examples of the computer readable recording medium include magnetic storage media (such as ROM, floppy disks, hard disks, etc.), and optical recording media (such as CD-ROMs, or DVDs). The computer readable recording medium can also be distributed over network coupled computer systems so that the computer readable code is stored and executed in a distributed fashion. This media can be read by the computer, stored in the memory, and executed by the processor. The memory included in the portable terminal can be an example of the computer readable recording medium suitable for storing a program or programs having instructions that implement the embodiments of the present disclosure. The present disclosure can be implemented by a program having codes for embodying the method described in claims, the program being stored in a machine readable storage medium. The program can be electronically carried on any medium, such as communication signals transferred via wired or wireless connection, and the present invention suitably includes its equivalent.

The portable terminal can receive and store the program from a program provider wiredly/wirelessly connected thereto. The program provider can include a program having instructions for the portable terminal to perform the method for controlling a multilateral conversation, a memory for storing information required for the method, a communication unit for wiredly/wirelessly communicating with the portable terminal, and a controller for receiving a request from the portable terminal and delivering corresponding programs to the portable terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling multilateral conversation in a portable terminal, the method comprising:
    executing a multilateral conversation with a plurality of counterparts in a text-chatting window;
    detecting an event for a private conversation to at least one counterpart selected among the plurality of counterparts during a session of the multilateral conversation in the text-chatting window;

sending first data inputted from a user for the selected at least one counterpart among the plurality of counterparts in the text-chatting window; and sending second data for the plurality of counterparts in the text-chatting window, wherein the first data is visible only to the selected at least one counterpart in the text-chatting window, and the second data is visible to the plurality of counterparts in the text-chatting window.

2. The method of claim 1, wherein the event comprises at least one of dragging a button for sending data to a particular person, touching an icon of the particular person, and dragging the icon of the particular person into an input window for inputting from the user.

3. The method of claim 2, wherein the event further comprises dragging the button to the icon of the particular person while the data to be sent to the particular person has already been entered.

4. The method of claim 1, further comprising displaying a pop-up window in response to touching an icon of a particular person or dragging the icon of the particular person into an input window for inputting from the user.

5. The method of claim 4, wherein the pop-up window comprises at least one of blocking the particular person, having the private conversation with the particular person, showing a user of a portable terminal offline status to the particular person, and sending a message to the particular person.

6. The method of claim 4, further comprising deactivating a private conversation mode in response to at least one of deleting the icon of the particular person dragged into the input window and dragging the icon of the particular person out of the input window.

7. The method of claim 1, further comprising displaying the data sent by adding an icon that indicates the private conversation to the data in response to sending the inputted data.

8. The method of claim 7, further comprising activating a private conversation mode in response to dragging the icon into an input window.

9. The method of claim 7, further comprising if a particular person sends a reply to the data sent, displaying the reply sent from the particular person using an activated private conversation mode.

10. The method of claim 1, wherein activating a private conversation mode in response to the detection of the event comprises
displaying an icon of a particular person in an input window for inputting from the user.

11. The method of claim 1, further comprising displaying the data sent in a screen for displaying the multilateral conversation,
wherein the data sent is displayed in the portable terminal and a portable terminal of a particular person.

12. A portable terminal for controlling multilateral conversation, the portable terminal comprising:
a touch screen configured to display multilateral conversation; and
a controller configured to:
execute a multilateral conversation with a plurality of counterparts in a text-chatting window;
detect an event for a private conversation to at least one counterpart selected among the plurality of counterparts during a session of the multilateral conversation in the text-chatting window;
send first data inputted from a user for the selected at least one counterpart among the plurality of counterparts in the text-chatting window; and
send second data for the plurality of counterparts in the text-chatting window,
wherein the first data is visible only to the selected at least one counterpart in the text-chatting window, and the second data is visible to the plurality of counterparts in the text-chatting window.

13. The portable terminal of claim 12, wherein the controller is further configured to detect at least one of dragging a button for sending data to a particular person, touching an icon of the particular person, and dragging the icon of the particular person into an input window for inputting from the user.

14. The portable terminal of claim 13, wherein the controller is further configured to deactivate a private conversation mode in response to at least one of deleting the icon of a particular person dragged into an input window and dragging the icon of the particular person out of the input window.

15. The portable terminal of claim 12, wherein the touch screen is further configured to display a pop-up window in response to touching an icon of a particular person or dragging the icon of the particular person into an input window for inputting from the user.

16. The portable terminal of claim 15, wherein the pop-up window comprises at least one of blocking the particular person, having the private conversation with the particular person, showing a user of a portable terminal offline status to the particular person, and sending a message to the particular person.

17. The portable terminal of claim 12, wherein the touch screen is further configured to display the data sent by adding an icon that indicates the private conversation to the data in response to sending the inputted data.

18. The portable terminal of claim 17, wherein the controller is further configured to activate the private conversation in response to detection of dragging the icon into an input window.

19. The portable terminal of claim 17, wherein the touch screen is further configured to display a reply sent from a particular person using an activated private conversation mode if the particular person sends the reply to the data sent.

20. The portable terminal of claim 12, wherein the controller is further configured to control an icon of a particular person to be displayed in an input window in response to detection of the event.

21. The portable terminal of claim 12, wherein the controller is further configured to detect an event of selecting data sent from a particular person, activate a private conversation mode with the particular person, and incorporate the data sent and data entered to an input window.

22. The portable terminal of claim 21, wherein the event comprises at least one of dragging the data sent into the input window, dragging a button for sending the entered data to the data sent, and dragging the data sent to the button.

23. The portable terminal of claim 12, wherein the controller is configured to activate a conversation mode with multiple participants of the multilateral conversation in response to detection of an event for conversation with the multiple participants during the multilateral conversation.

* * * * *